(12) United States Patent
Miyagawa et al.

(10) Patent No.: US 11,831,831 B2
(45) Date of Patent: Nov. 28, 2023

(54) IMAGE READING APPARATUS AND METHOD OF CREATING CORRECTION DATA

(71) Applicant: SEIKO EPSON CORPORATION, Tokyo (JP)

(72) Inventors: Tomokazu Miyagawa, Kitakyushu (JP); Masahiko Mizoguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/173,701

(22) Filed: Feb. 23, 2023

(65) Prior Publication Data
US 2023/0276008 A1 Aug. 31, 2023

(30) Foreign Application Priority Data

Feb. 25, 2022 (JP) ................................. 2022-027965
Mar. 23, 2022 (JP) ................................. 2022-046349

(51) Int. Cl.
*H04N 1/028* (2006.01)
*H04N 1/00* (2006.01)

(52) U.S. Cl.
CPC ..... *H04N 1/02855* (2013.01); *H04N 1/00628* (2013.01); *H04N 1/00* (2013.01)

(58) Field of Classification Search
CPC ... H04N 1/02855; H04N 1/00628; H04N 1/00
USPC ......................................................... 358/475
See application file for complete search history.

(56) References Cited

U.S. PATENT DOCUMENTS

| 2014/0293372 A1* | 10/2014 | Okamoto ........... H04N 1/02865 |
| | | 358/475 |
| 2014/0376065 A1* | 12/2014 | Okamoto ........... H04N 1/00989 |
| | | 358/475 |
| 2018/0262646 A1 | 9/2018 | Gotoh et al. |
| 2019/0120450 A1* | 4/2019 | Chien ..................... F21S 8/035 |

FOREIGN PATENT DOCUMENTS

JP    2017-098716 A    6/2017

* cited by examiner

Primary Examiner — Darryl V Dottin
(74) Attorney, Agent, or Firm — WORKMAN NYDEGGER

(57) ABSTRACT

An image reading apparatus includes a reading module provided with reading elements arranged in a direction of arrangement intersecting a direction of transportation of an original copy, and configured to read an image on the transported original copy. The apparatus also includes a background plate provided with a white background portion for shading correction, and a black background portion for cutting out the original copy and having lower brightness than brightness of the white background portion. An area of the black background portion is larger than an area of the white background portion, and the white background portion and the black background portion are arranged in the direction of arrangement.

18 Claims, 28 Drawing Sheets

IMAGE READING APPARATUS AND METHOD OF CREATING CORRECTION DATA

The present application is based on, and claims priority from JP Application Serial Number 2022-027965, filed Feb. 25, 2022 and JP Application Serial Number 2022-046349, filed Mar. 23, 2022, the disclosures of which are hereby incorporated by reference herein in their entirety.

BACKGROUND

1. Technical Field

The present disclosure relates to an image reading apparatus that performs shading correction, and to a method of creating correction data.

2. Related Art

An image reading apparatus performs shading correction in order to reduce an effect of unevenness of density among pixels attributed to, for example, uneven illumination from a reading light source. A storage unit of the image reading apparatus stores dark reference data that is obtained by conversion, into digital data, of an image signal outputted from an image sensor when performing reading while turning off a reading light source for the image sensor. The storage unit also stores white reference difference data that is obtained by conversion, into digital data, of an image signal outputted from the image sensor when performing reading of a white reference image which is pure white. The shading correction function based on the dark reference data and the white reference difference data reduces an effect of unevenness in density among pixels in the digital data, which is obtained by conversion of an analog signal outputted from the image sensor by using an analog-to-digital (A/D) converter.

A scanner in which a background plate is prepared to face an image sensor is known as such an image reading apparatus. As mentioned earlier, this background plate is preferred to be as white as possible for obtaining the white reference difference data.

On the other hand, a black background plate is convenient for the purpose of finding a defect in an original copy or in light of an image cutout function to eliminate margins of a read image. For this reason, there is an image reading apparatus having a function to switch the color of the background plate from white to black. An original copy may partially include a dark zone such as a photograph and a drawing. In this regard, a blacker background plate can detect a defect more accurately.

An image reading apparatus disclosed in JP-A-2017-98716 includes a function to move and switch between a white background for shading correction and a black background for cutting out an original copy so as to enable the image reading apparatus to perform reading while switching the background between white and black.

The above-described image reading apparatus includes a mechanism for moving the background and therefore has a complicated structure. Accordingly, a background plate for reading white and black backgrounds with a simple structure is expected.

SUMMARY

An aspect of the present disclosure provides an image reading apparatus which includes: a reading module including reading elements arranged in a direction of arrangement intersecting a direction of transportation of an original copy, and configured to read an image on the original copy being transported; an illumination unit that illuminates, with light, a reading range to be read by the reading module; a background plate facing the reading elements at a position illuminated with the light; and a control unit that controls reading of the image. The reading module, the illumination unit, and the background plate are disposed at positions fixed in the direction of transportation. The background plate includes a white background portion for shading correction, and a black background portion for cutting out the original copy, which has lower brightness than that of the white background portion. An area of the black background portion is larger than an area of the white background portion, and the white background portion and the black background portion are arranged in the direction of arrangement.

An aspect of the present disclosure provides a method of creating correction data for an image reading apparatus, which includes a reading module disposed in such a way as to intersect a direction of transportation to transport an original copy and configured to read an image on the transported original copy, and a background plate facing the reading module. The reading module and the background plate are fixed so as not to move in the direction of transportation. The background plate is disposed to face a reading region to be read by the reading module, and includes a white background portion having high brightness for shading correction, and a black background portion, which has lower brightness than the brightness of the white background portion, for shading correction and for cutting out the original copy. An area of the black background portion is larger than an area of the white background portion, and the white background portion and the black background portion are arranged in a main scanning direction for reading by the reading module. The method includes: reading the white background portion and the black background portion with the reading module in a state where the original copy is not present, and creating, based on read data of the white background portion and the black background portion being read, correction data used for correcting read data of the original copy, and, after reading the image on the original copy, cutting out, based on the read data of the original copy in the black background portion, data of the image on the original copy.

DESCRIPTION OF EXEMPLARY EMBODIMENTS

An embodiment of the present disclosure will be described below. Needless to say, the following embodiment merely represents a certain example of the present disclosure, and all of features depicted in the embodiment are not always essential for a solution of the present disclosure.

1. OUTLINE OF TECHNIQUES INCLUDED IN PRESENT DISCLOSURE

First, an outline of techniques included in the present disclosure will be described with reference to examples illustrated in FIGS. 1 to 32. The drawings of the present application are diagrams schematically illustrating examples. Magnification percentages in respective directions illustrated in these drawings may be different from one another and the drawings may therefore be inconsistent with one another in some cases. Needless to say, constituents of the present technique are not limited to specific examples indicated with reference signs. In the section "Outline of techniques included in present disclosure", each description in parenthesis means a supplementary explanation on an immediately preceding term.

Techniques related to the present technique will be described with reference to FIGS. 1 to 22. Here, "black reference data" illustrated in FIGS. 5 to 10 corresponds to "black reference read data", "background plate data" illustrated in FIGS. 5 to 10 corresponds to "background plate read data", and "white reference data" illustrated in FIGS. 5 to 10 corresponds to "white reference read data".

Figure 1:
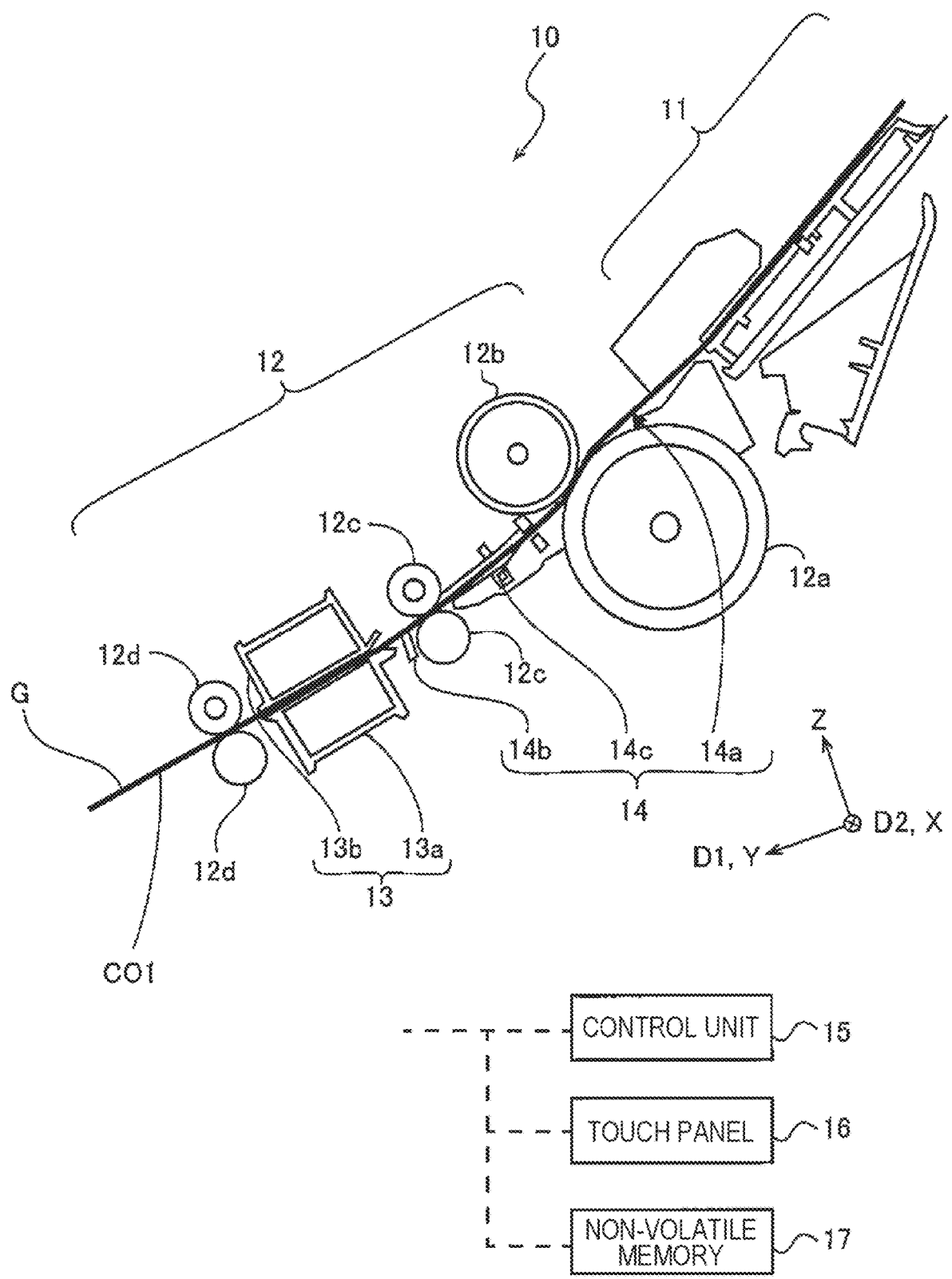
FIG. 1 is a schematic sectional view illustrating a configuration of an image reading apparatus.
Figure 2:
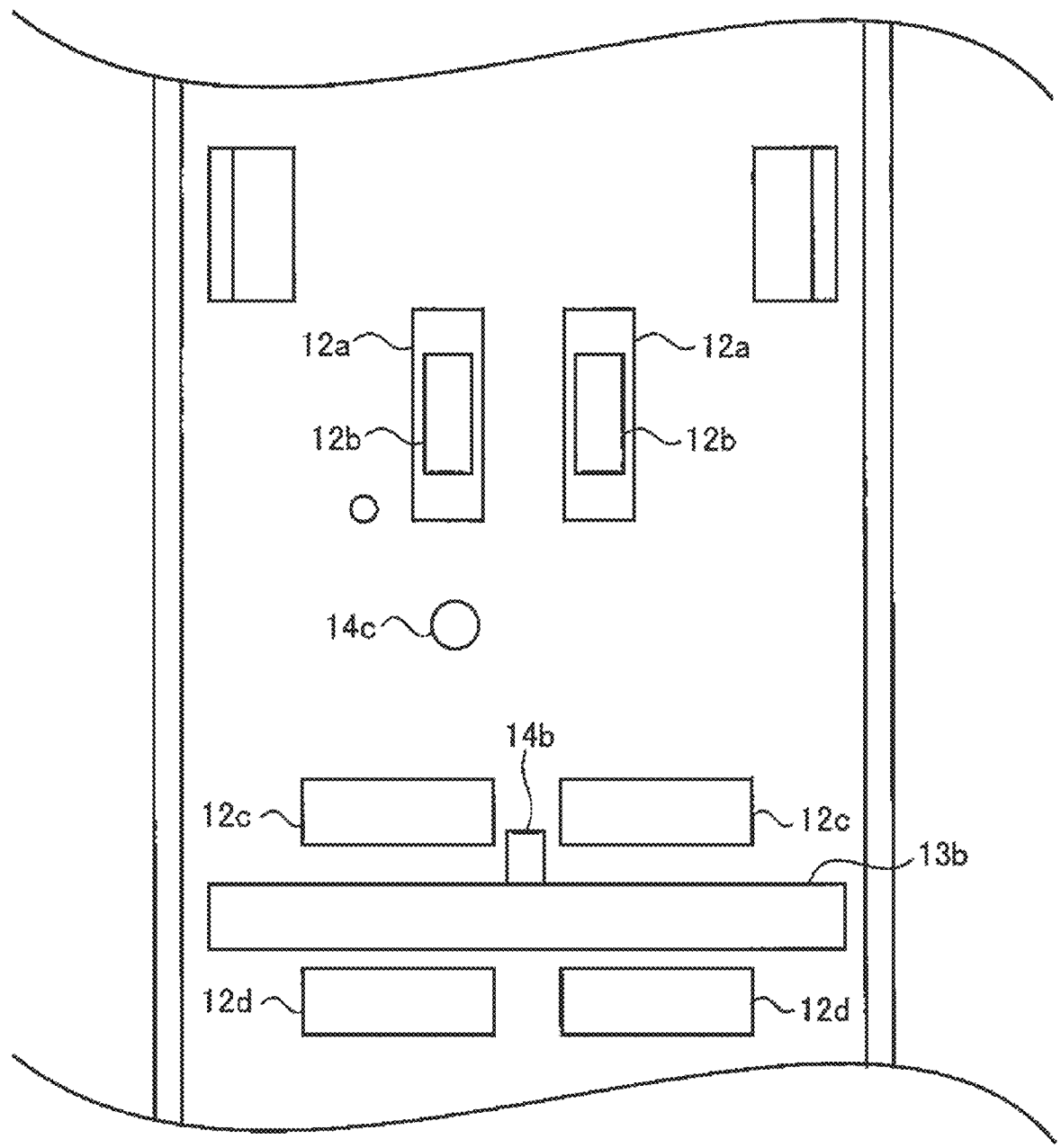
FIG. 2 is a schematic plan view illustrating a configuration of a transportation route in the image reading apparatus.
Figure 3:
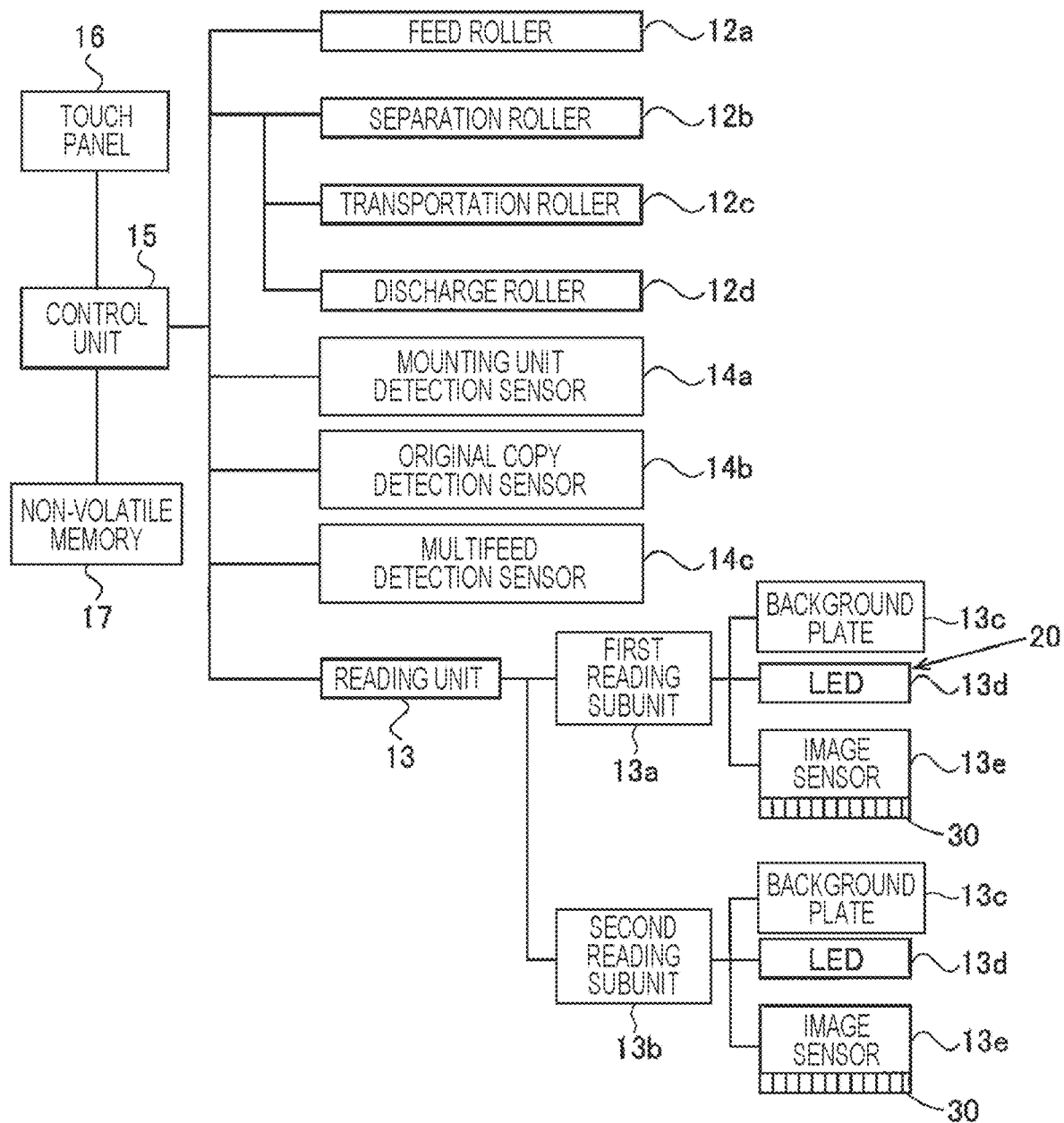
FIG. 3 is a schematic block diagram illustrating an overall configuration of the image reading apparatus.

FIG. 1 is a schematic sectional view illustrating a configuration of an image reading apparatus. FIG. 2 is a schematic plan view illustrating a configuration of a transportation route CO1 in the image reading apparatus. FIG. 3 is a schematic block diagram illustrating an overall configuration of the image reading apparatus. In the X-Y-Z coordinate system illustrated in, for example, FIGS. 1, 23, and 24, x direction is a width direction of an image reading apparatus 10, which is also a width direction of an original copy G and a direction D2 of arrangement of reading elements 30. Meanwhile, y direction is a direction orthogonal to the x direction, which is also a direction D1 of transportation of the original copy G. Moreover, z direction is a direction orthogonal to the x direction and to the y direction, which is also a direction substantially orthogonal to a surface of the original copy G. Here, the x direction and the y direction do not always have to be orthogonal to each other as long as these directions cross each other. The x direction and the z direction do not always have to be orthogonal to each other as long as these directions cross each other. The y direction and the z direction do not always have to be orthogonal to each other as long as these directions cross each other.

The image reading apparatus 10 includes a mounting portion 11 to mount the original copy G, a transportation unit 12 that transports, on the predetermined transportation route CO1, the original copy G mounted on the mounting portion 11, a reading unit 13 that reads the transported original copy G, a detection unit 14 that detects presence of the original copy G on the transportation route CO1, a control unit 15 that controls the image reading apparatus 10, a touch panel 16 that enables display and input, and a non-volatile memory 17 that stores data. Here, the non-volatile memory 17 represents an example of a storage unit. As exemplified in FIG. 3, the reading unit 13 includes background plates 13c, illumination units 20 each provided with LEDs (light-emitting diodes) 13d, and image sensors 13e. As exemplified in FIGS. 3 and 4, in the image sensors 13e, sensor chips 13f (see FIG. 4), each of which includes the reading elements 30 (see FIG. 3) arranged in the direction D2 of arrangement, are arranged in the direction D2 of arrangement. The control unit 15 includes a central processing unit (CPU) serving as a processor, a read-only memory (ROM), a random access memory (RAM), and the like. The CPU executes a variety of processing by reading information stored in the nonvolatile memory 17 and loading the information into the RAM as appropriate, and executing programs thus read. In a system in which the image reading apparatus 10 is coupled to a control device such as an external personal computer, the control device may carry out control, determination, and so forth in conjunction with the control unit 15.

The transportation unit 12 includes a feed roller 12a located on a lower side of the transportation route, a separation roller 12b located on an upper side of the transportation route in such a way as to face the feed roller 12a, transportation rollers 12c located on the upper side and the lower side of the transportation route, and discharge rollers 12d located on the upper side and the lower side of the transportation route.

The transportation roller 12c and the discharge roller 12d located on the lower side of the transportation route are linked to a driving mechanism and are thus rotated. The transportation rollers 12c transport the original copy G to the reading unit 13, and the discharge rollers 12d transport and discharge the original copy G read by the reading unit 13.

The feed roller 12a and the separation roller 12b are disposed at a central portion in a width direction of the transportation route. The transportation rollers 12c and the discharge rollers 12d are disposed downstream of the feed roller 12a and the separation roller 12b in a direction of transportation. A roller width of each of the transportation rollers 12c and the discharge rollers 12d is larger than a roller width of the feed roller 12a. The roller width of each of the transportation rollers 12c and the discharge rollers 12d is larger than a roller width of the separation roller 12b.

The detection unit 14 is configured to detect presence of the original copy G at certain regions on the transportation route. The detection unit 14 includes a mounting unit detection sensor 14a that detects the original copy at the mounting portion 11, an original copy detection sensor 14b that detects the original copy at a downstream position near the transportation roller 12c, and a multifeed detection sensor 14c that detects multifeed.

The reading unit 13 includes a pair of reading subunits 13a and 13b facing each other with the transportation route interposed in between. Each of the reading subunits 13a and 13b includes the background plate 13c, the LEDs 13d serving as a light source, and the image sensor 13e serving as a reading module. The LEDs 13d emit light toward the original copy opposed thereto, and the image sensor 13e outputs a detection signal that corresponds to an intensity of reflected light. The background plate 13c is located on an opposite side across the original copy. In the image sensor 13e, numerous reading elements are arranged in the width direction of the transportation route. Each reading element corresponds to a pixel. The reading subunits 13a and 13b read images on two surfaces of the original copy G being transported in the direction of transportation. The image sensor is also called as a line sensor.

The image sensor 13e of the reading unit 13 corresponds to the reading module, which is disposed in such a way as to intersect the transportation route of the original copy and configured to read the images on the original copy G that passes through the transportation route. The background plate 13c is disposed facing the image sensor 13e serving as the reading module with the transportation route interposed in between. The background plate 13c and the image sensor 13e of the present embodiment are fixed to respective predetermined positions so as not to move in the direction of transportation of the original copy. The background plate 13c and the image sensor 13e are fixed and are therefore kept from being rotated.

The touch panel 16 displays a predetermined image based on an instruction from the control unit 15, and outputs a touched position to the control unit 15 when a user performs a touching operation. The control unit 15 can give instructions about display of a menu to the user or obtain details of the operation by the user based on the touched position operated by the user.

Figure 4:
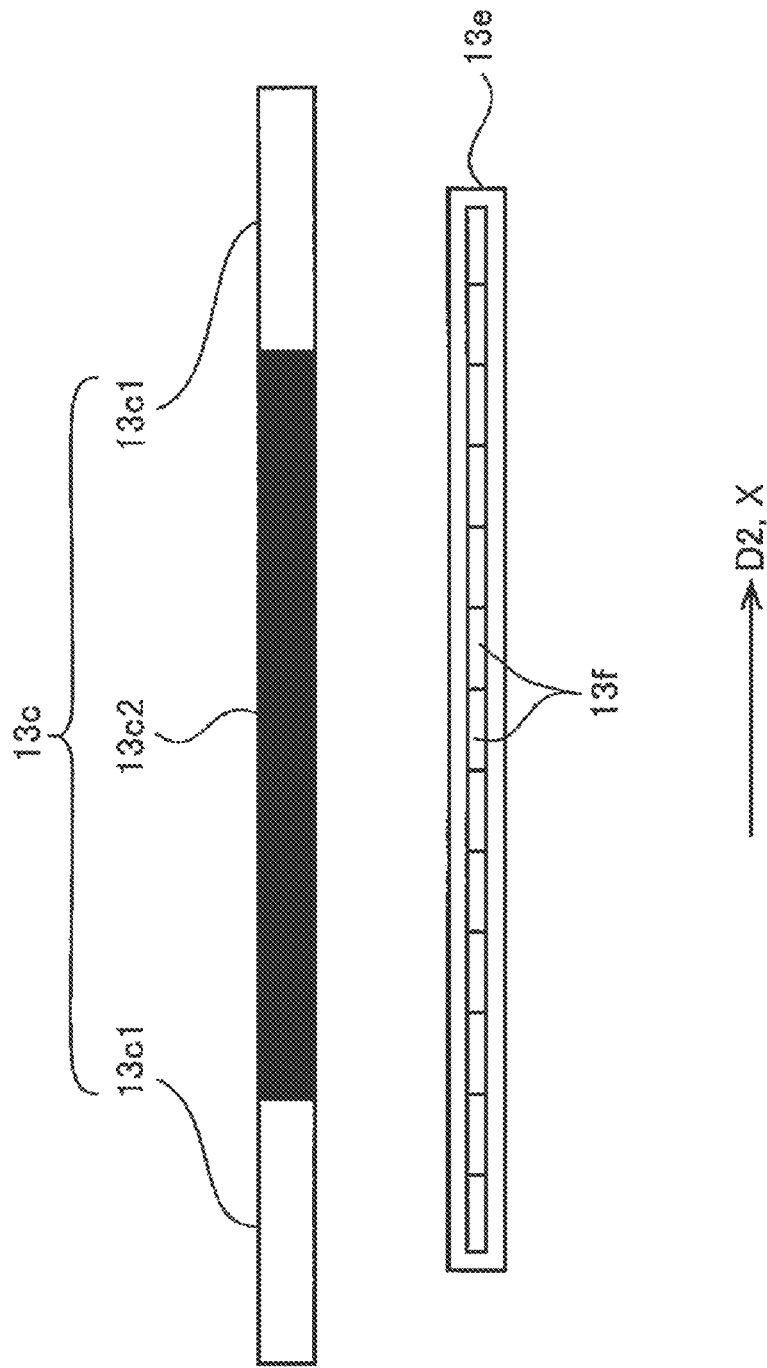
FIG. 4 is a schematic diagram illustrating a background plate and an image sensor.

FIG. 4 is a schematic diagram illustrating the background plate and the image sensor.

The image sensor 13e includes the numeral reading elements arranged in the width direction of the transportation route. Here, the reading elements excluding those located at two ends and in the vicinity thereof are actually used in the present embodiment, and a width of the used reading elements defines a maximum effective pixel width. The background plate 13c is disposed to face a reading region of the image sensor 13e. Two end portions of the background plate 13c in the width direction of the transportation route define white background portions 13c1 having a high brightness for shading correction and a portion therebetween defines a black background portion 13c2 having lower brightness than each white background portion 13c1. The black background portion 13c2 is used for shading correction and for cutting out the original copy. In other words, the white background portion 13c1, the black background portion 13c2, and the white background portion 13c1 are disposed in the direction D2 of arrangement of the image sensor 13e serving as the reading module. The direction D2 of arrangement is the same direction as a main scanning direction being a reading direction of the image sensor 13e. The direction D2 of arrangement is also the same as the width direction of the transportation route.

As described above, the white background portions 13c1 are provided in zones at two ends of the background plate 13c in the direction intersecting the transportation route, and the black background portion 13c2 is provided in a zone between the white background portions 13c1.

Each white background portion 13c1 having a high brightness generally represents a color that is as white as possible. Likewise, the black background portion 13c2 having the lower brightness than that of the white background portion 13c1 generally represents a color that is as black as possible. These background portions are not always defined by specific brightness thresholds. A medium color of gray may substitute for the white background portion 13c1.

The black background portion 13c2 disposed at the center is wider than a width of a conceivable major original copy G. On the other hand, the white background portions 13c1 disposed at the two ends merely occupy the remaining portions at the two ends. In other words, the area of the black background portion 13c2 is larger than the areas of the white background portions 13c1. Assuming that, for example, the conceivable major original copy G is accurately located at the center in the width direction of the transportation route and is transported straight without being skewed, part of the black background portion 13c2 appears on two sides in the width direction of the original copy G, so that the image sensor 13e can read the black background portion 13c2 as an image.

The white background portions 13c1 and the black background portion 13c2 of the background plate 13c are disposed in the same plane where distances from the image sensor 13e serving as the reading module are equal. In the image sensor 13e serving as the reading module, the reading elements are arranged in the direction of arrangement, and a part of each white background portion 13c1 is located at a position facing effective reading elements near an end portion of these reading elements. In the present embodiment, the reading elements face the white background portions 13c1 at the two ends within a range of the maximum effective pixel width. Instead, the reading elements may face the white background portion 13c1 on one side as long as the reading elements fall within the maximum effective pixel width.

Accuracy in shading correction and cutout processing is improved by setting positions of the background plate 13c from the image sensor 13e serving as the reading module to the same length.

In the image reading apparatus 10 of the present embodiment, the mounting portion 11 serving as an original copy supply unit to supply the original copy G and the feed roller 12a are disposed at a starting end of the transportation route. The separation roller 12b serving as a separation unit to separate each sheet of the original copy from multiple sheets of the original copy so as not to feed two or more sheets of the original copy is disposed substantially at a central region in the width direction of the transportation route. In terms of a positional relation with this separation unit, the black background portion 13c2 of the present embodiment is located at a position including the separation roller 12b, which is the separation unit, in the width direction being the direction intersecting the direction of transportation, and the white background portions 13c1 are located at positions not including the separation roller 12b, which is the separation unit, in the width direction.

The original copy detection sensor 14b is located substantially at the center of the transportation route. The black background portion 13c2 is located at a position including the original copy detection sensor 14b in the width direction being the direction intersecting the direction of transportation. The white background portions 13c1 are located at positions not including the original copy detection sensor 14b in the width direction.

Likewise, the multifeed detection sensor 14c is located near the center of the transportation route although it is not exactly the central position. The black background portion 13c2 is located at a position including the multifeed detection sensor 14c in the width direction with respect to the direction of transportation, and the white background portions 13c1 are located at positions not including the multifeed detection sensor 14c in the width direction. The separation roller 12b, the transportation rollers 12c, the discharge rollers 12d, the original copy detection sensor 14b, and the multifeed detection sensor 14c are located between the white background portions 13c1.

Note that the white background portions 13c1 and the black background portion 13c2 are located at positions facing the LEDs 13d.

Figure 5:
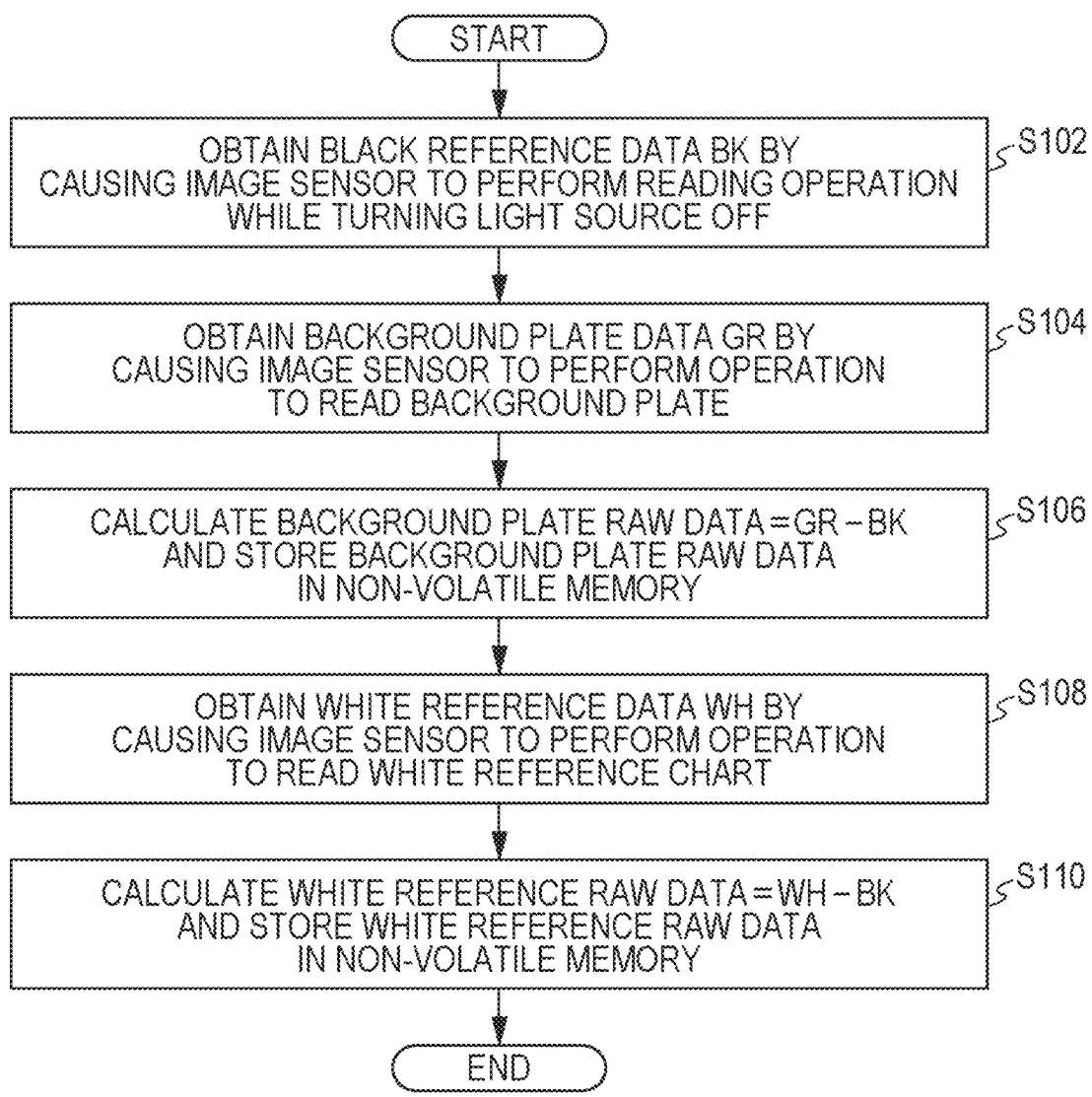
FIG. 5 is a flowchart of preliminary processing of a reference example.
Figure 6:
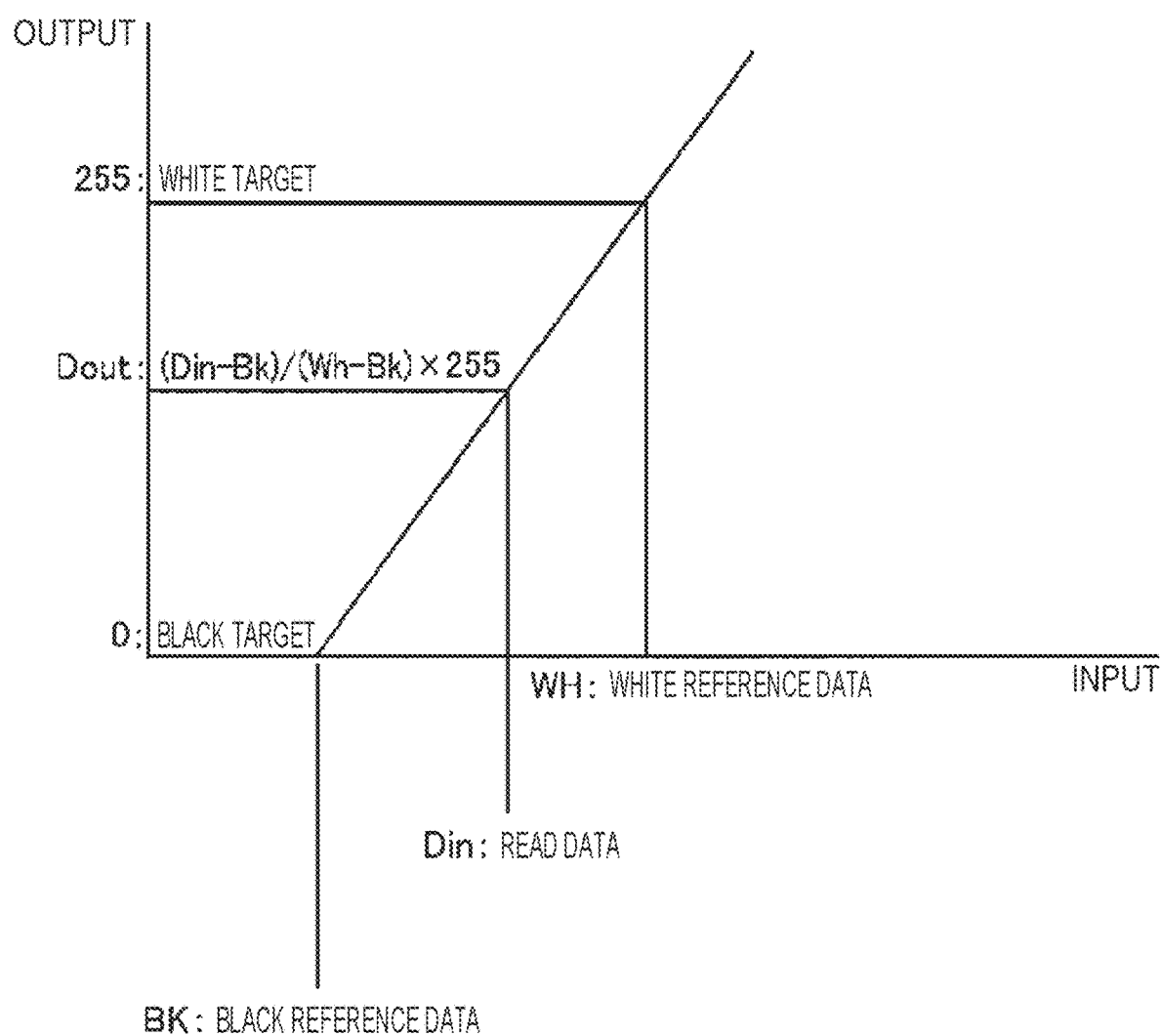
FIG. 6 is a diagram illustrating output characteristics of the image sensor.
Figure 7:
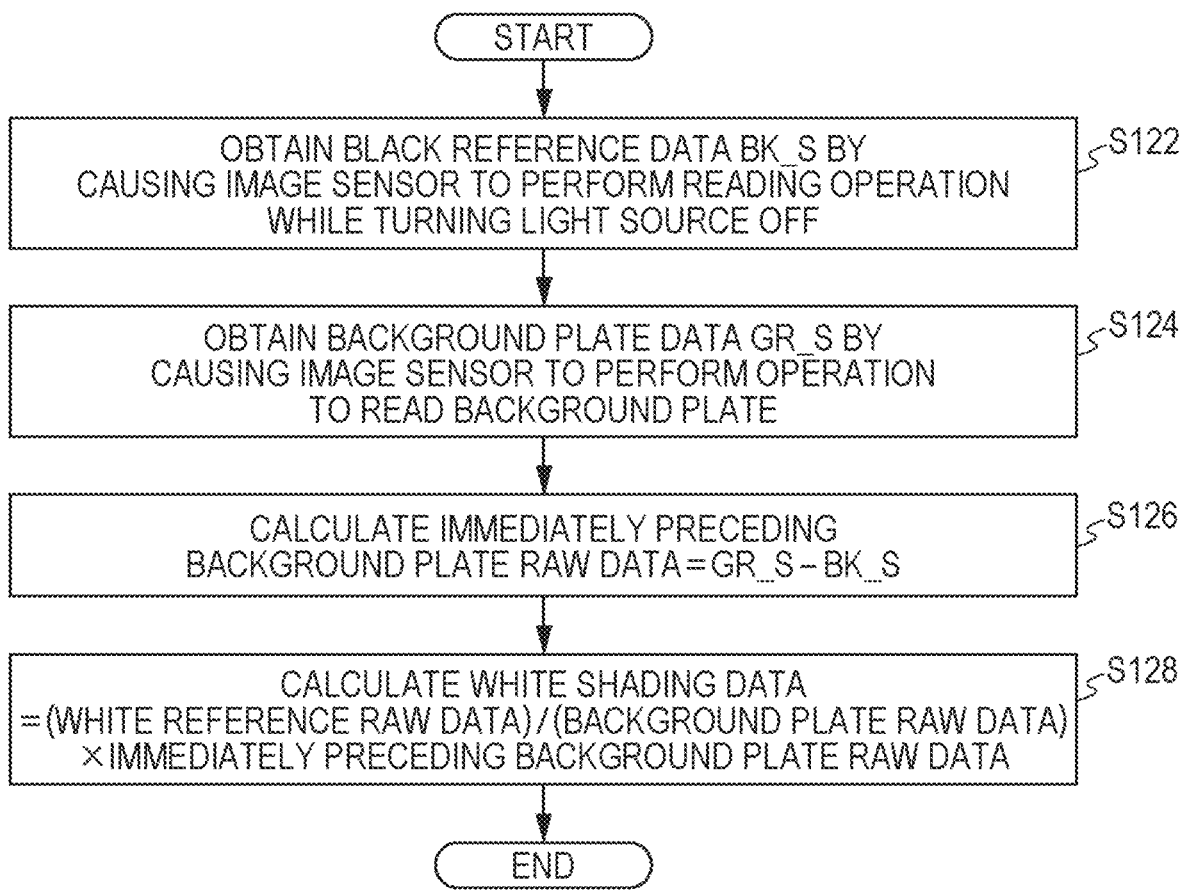
FIG. 7 is a flowchart for calculating white shading data according to the reference example.

FIG. 5 is a flowchart of preliminary processing of a reference example. FIG. 6 is a diagram illustrating output characteristics of the image sensor. FIG. 7 is a flowchart for calculating white shading data of the reference example.

FIG. 6 depicts an input-to-output relation of each reading element constituting the image sensor 13e. In FIG. 6, the horizontal axis indicates the input, and the vertical axis indicates the output. By using the reading element, a range between the darkest input to the brightest input is obtained, as indicated on the horizontal axis, from an output value when capturing an image of a black background (a black target) without illuminating the background and from an output value when capturing an image of a reference background (a white target) as white as possible while illuminating the background. In this range of the input, FIG. 6 depicts that the value of output from the reading element varies in a range from 0 to 255.

As illustrated in FIG. 6, the input varies in a range from black (minimum) to white (maximum) in reality, and does not always vary from null to the maximum value as an absolute value. Accordingly, the output does not always vary from null (0) to the maximum value (255). In this regard, it is necessary to carry out processing to associate a variation width of the output from each reading element with a maximum variation width between brightness and darkness in reality.

This association requires processing at the time of factory shipment and processing at a start of scanning. FIG. 5 illustrates the processing at the time of factory shipment. As mentioned above, the background plate of the reference example is switchable between black and white or gray. In the following, a white or gray surface is set to a surface of the background plate at the time of factory shipment.

An operation is described as follows. In step S102, black reference data BK is obtained by causing the image sensor to perform a reading operation in a state of turning the LEDs off. In step S104, background plate data GR is obtained by causing the image sensor to perform an operation to read the background plate in a state of turning the LEDs on. In step S106, background plate RAW data is calculated based on the following formula (1), and then the background plate RAW data is stored in the non-volatile memory:

$$\text{background plate RAW data} = GR - BK \tag{1}$$

Next, in step S108, white reference data WH is obtained by disposing a white reference chart on the transportation route and causing the image sensor to perform a reading operation in the state of turning the LEDs on. In step S110, white reference RAW data is obtained based on the following formula, and then the white reference RAW data is stored in the non-volatile memory:

$$\text{white reference RAW data} = WH - BK \tag{2}$$

In this way, the background plate RAW data and the white reference RAW data are stored in the non-volatile memory at the time of factory shipment.

Input-output characteristics of the image sensor change due to various factors and by influences of variations over time and the like. That is why processing to calculate white shading data for correcting such changes is carried out immediately before scanning. The white or gray surface is set to the surface of the background plate in this case as well.

In step S122, black reference data BK_S is obtained by causing the image sensor to perform a reading operation in the state of turning the LEDs off. In step S124, background plate data GR_S is obtained by causing the image sensor to perform an operation to read the background plate in the state of turning the LEDs on. In step S126, immediately preceding background plate RAW data is calculated based on the following formula (3):

$$\text{Immediately preceding background plate RAW data} = GR\_S - BK\_S \tag{3}$$

Next, in step S128, the white shading data is obtained based on the following formula (4) by using the white reference RAW data and the background plate RAW data stored in the non-volatile memory and in addition the immediately preceding background plate RAW data thus calculated:

white shading data=(white reference RAW data)/
(background plate RAW data)×immediately preceding background plate RAW data   (4).

A value Dout obtained by subjecting input of each pixel data Din to shading correction is expressed by the following formula (5):

$$D_{out}=(D_{in}-BK)/(WH-BK)\times 255 \quad (5).$$

After the white shading data is successfully obtained, the surface of the background plate is mechanically changed to the black surface. The surface is changed because a difference in brightness from the original copy is larger when the background plate is black, so that the accuracy of cutting out the original copy can be increased.

In order to increase the accuracy of cutting out the original copy while calculating the white shading data in accordance with the above-described processing, the configuration of the reference example has to be provided with the background plate having the black surface and the white surface on two sides, and with the mechanism for switching between these surfaces.

In contrast, as illustrated in FIG. 4, the background plate 13c of the present embodiment is not configured to switch between the surfaces, but is instead provided with the white background portions 13c1 located at the two ends of one surface and the black background portion 13c2 located at the center of the one surface.

As a consequence, the reading elements of the image sensor 13e facing the white background portions 13c1 cannot measure input-output relations when these reading elements face the black background portion, and the reading elements of the image sensor 13e facing the black background portion 13c2 cannot measure input-output relations when these reading elements face any of the white background portions.

In view of the circumstances in which the measurement is infeasible, the present embodiment makes up for such a deficient measurement result by computation. Here, all of the computation and the like are carried out by the control unit 15, an externally coupled PC, and the like.

Figure 8:
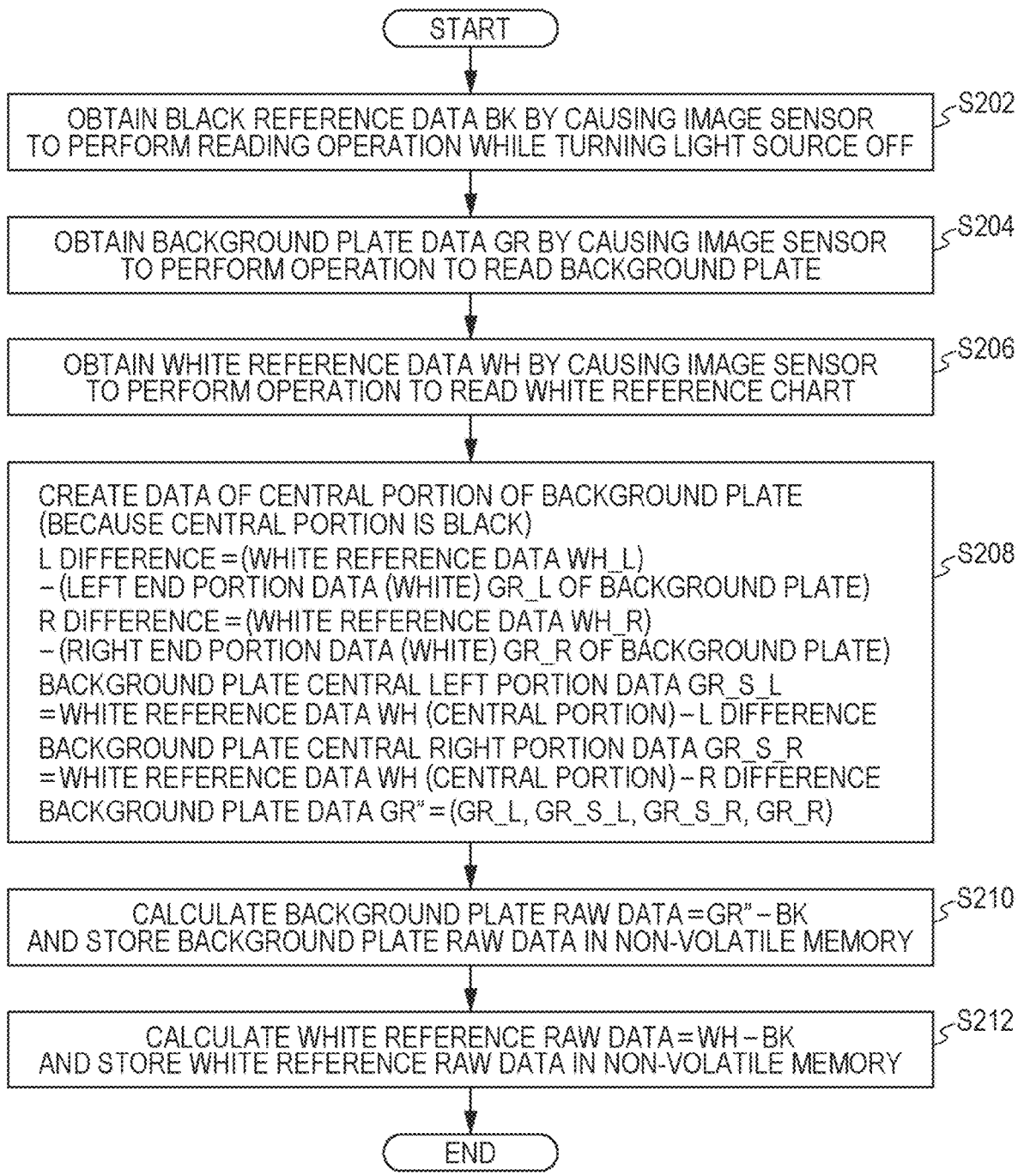
FIG. 8 is a flowchart of preliminary processing.
Figure 9:
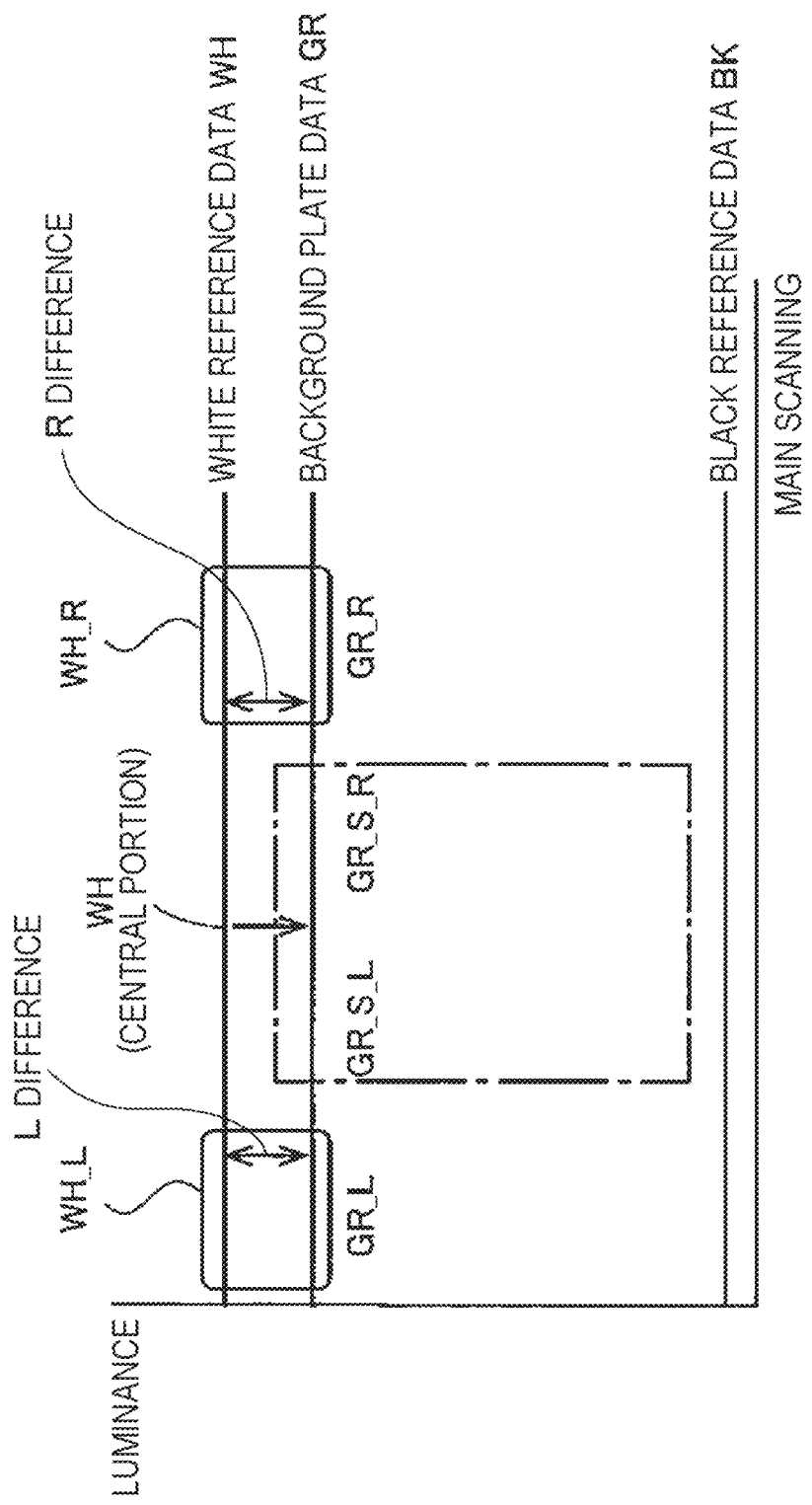
FIG. 9 is a diagram illustrating output from a reading unit corresponding to the background plate.

FIG. 8 is a flowchart of preliminary processing, and FIG. 9 is a diagram illustrating output from the reading unit corresponding to the background plate.

First, in step S202, the image sensor 13e is caused to obtain the black reference data BK by performing a reading operation in the state of turning the LEDs 13d off. In step S204, the image sensor 13e is caused to obtain the background plate data GR by performing an operation to read the background plate 13c in the state of turning the LEDs 13d on. Here, the background plate data GR includes a portion concerning the white background portions 13c1 and a portion concerning the black background portion 13c2. Thereafter, in step S206, the white reference data WH is obtained by causing the image sensor 13e to perform an operation to read the white reference chart. The white reference data WH is stored in the non-volatile memory.

Next, the above-mentioned computation of the deficient measurement result is carried out in step S208. To begin with, since the central portion of the background plate 13c is black, the following computation is carried out in order to create data of the central portion.

Differences of the white background portions 13c1 of the background plate 13c from the white reference data WH are obtained. Here, in terms of left end portion data (white) GR_L of the white background portion 13c1 at the left end and right end portion data (white) GR_R of the white background portion 13c1 at the right end, the differences are individually obtained by calculating an L difference in accordance with the following formula (6) and calculating an R difference in accordance with the following formula (7). Here, average values may be obtained regarding the pixels in the entire region:

L difference=(white reference data $WH\_L$)−(background plate left end portion data (white) $GR\_L$)   (6); and R difference=(white reference data $WH\_R$)−(background plate right end portion data (white) $GR\_R$)   (7).

Next, deficient measurement results regarding the pixels at the central portion of the background plate 13c (background plate central left portion data GR_S_L and background plate central right portion data GR_S_R) are calculated by computation based on the following formulae (8) and (9):

background plate central left portion data $GR\_S\_L$=white reference data $WH$(central portion)−L difference   (8); and background plate central right portion data $GR\_S\_R$=white reference data $WH$ (central portion)−R difference   (9).

As a consequence, background plate data GR" includes values GR_L, GR_S_L, GR_S_R, and GR_R, which are arranged from the left end.

In other words, the zones of the white background portions 13c1 having the high brightness of white or gray are required as the background plate 13c in order to obtain the white shading data. However, this brightness is insufficient in the zone of the black background portion 13c2. Accordingly, regarding the black background portion 13c2, a difference value between the measurement result of the white background portions 13c1 measured at the two ends and the white reference chart is obtained in advance, and a measurement result corresponding to the white background portion is estimated by subtracting the difference value from a measurement result of the white reference chart measured in the zone of the black background portion 13c2.

In the case of the formulae (6) to (9), a difference value at the left end and a difference value at the right end are separately provided in order to increase accuracy of estimation. Moreover, regarding the black background portion 13c2, a difference value at the left end is applied to a region close to the left end and a difference value at the right end is applied to a region close to the right end. Instead of the configuration to illuminate the entire surface, there are LEDs 13d configured to dispose a light source either on the right end or on the left end, and to spread light across the entire surface by using a light guide plate. In this case, illuminance on an opposite side from the position at which the light source is disposed tends to decrease even by use of the light guide plate. In this regard, the accuracy may be increased by applying the difference value at the left end and the difference value at the right end to the pixels at the center while carrying out weighting depending on the distance from the light source.

As described above, regarding the zone defined as the black background portion 13c2 having the low brightness out of the background plate 13c, the background plate data GR is calculated from the measurement result of the black background portion 13c2 relative to the white reference chart by using the difference value between the white background portions 13c1 having the high brightness and the white reference chart.

In the present embodiment, the white background portions 13c1 are disposed at the two ends and the black background portion 13c2 is disposed at the center. However, it is also possible to obtain the background plate data at the black background portion 13c2 by using the measurement result of the white background portions 13c1. Accordingly, various modified examples are acceptable regarding the layout of the white background portions 13c1 and the black background portion 13c2. This will be discussed later.

Nonetheless, the provision of the white background portions 13c1 at the two ends makes it possible to increase data to be acquired as the white reference data as compared to provision of the white background portion 13c1 only at one end, thus leading to an improvement in shading correction.

Thereafter, the background plate RAW data is calculated based on the following formula (10) in step S210 and the white reference RAW data is calculated based on the following formula (11) in step S212:

$$\text{background plate RAW data} = GR'' - BK \quad (10); \text{ and}$$

$$\text{white reference RAW data} = WH - BK \quad (11).$$

The data thus obtained are stored in the non-volatile memory and the product is shipped from the factory.

Figure 10:
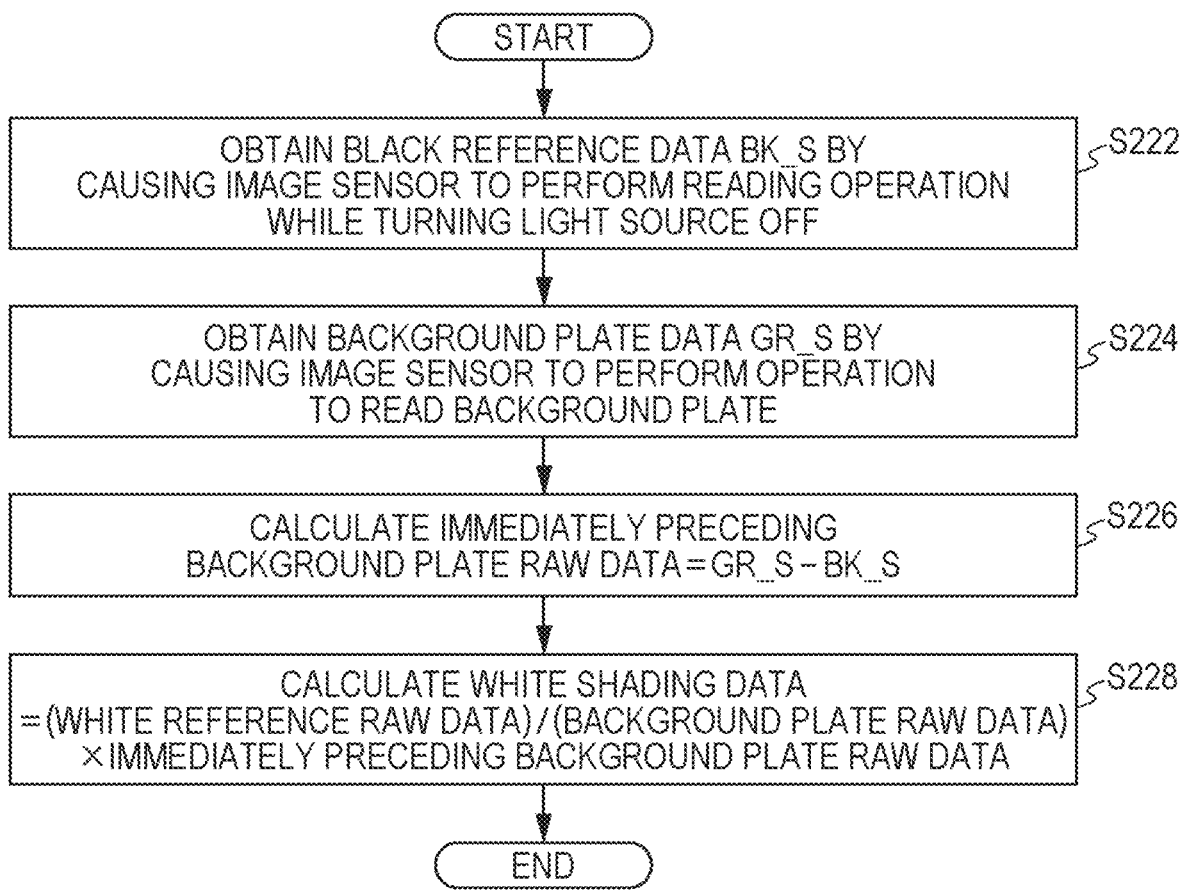
FIG. 10 is a flowchart for calculating white shading data.

FIG. 10 is a flowchart for calculating the white shading data.

The white shading data is calculated as described below immediately before the scanning. In step S222, the black reference data BK_S is obtained by causing the image sensor 13e to perform a reading operation in the state of turning the LEDs 13d off. In step S224, the background plate data GR_S is obtained by causing the image sensor to perform an operation to read the background plate 13c in the state of turning the LEDs 13d on. The background plate data GR_S is computed as with the formulae (6) to (9). The white reference data WH stored in the non-volatile memory is used in this instance.

Then, in step S226, the immediately preceding background plate RAW data is calculated based on the following formula (12):

$$\text{immediately preceding background plate RAW data} = GR\_S - BK\_S \quad (12).$$

Moreover, in step S228, the white shading data is calculated based on the following formula (13):

$$\text{white shading data} = (\text{white reference RAW data}) / (\text{background plate RAW data}) \times \text{immediately preceding background plate RAW data} \quad (13).$$

As explained above, according to the above-described embodiment, it is possible to carry out shading correction and to cut out the original copy appropriately without providing the background plate with a mechanism for switching between the white and black surfaces, and also to reduce the number of components.

Thus, the above-described image reading apparatus includes the control unit 15 that controls the image reading. This control unit 15 reads the white background portions 13c1 and the black background portion 13c2 with the image sensor 13e serving as the reading module in the state where the original copy G is not present. Then, the control unit 15 creates the correction data for correcting the read data of the original copy G based on the read data of the white background portions 13c1 and the black background portion 13c2 which are read as described above.

As described above, the black background portion 13c2 disposed at the center spreads larger than the width of the conceivable major original copy G. When the conceivable major original copy G is located precisely at the center in the width direction on the transportation route and is transported straight thereon, portions of the black background portion 13c2 appear on two sides in the width direction of the original copy G, so that an image can be cut out accurately.

However, the original copy G does not always pass straight through the center of the transportation route as expected without being skewed. Original copy cutout processing in the case of providing the background plate 13c with the black background portion 13c2 will be described below.

When two end portions of the background plate are white and a central portion thereof is black In the background plate 13c, the white background portions 13c1 are disposed on outer sides in the width direction and the black background portion 13c2 is disposed therebetween. The width of the black background portion 13c2 is larger than the width of the conceivable major original copy G. When black background portion 13c2 has this size, the original copy is cut out of a black zone of the background plate 13c while removing, from processing targets, the pixels included in white zones located at the two ends in the width direction of the background plate 13c. Here, the zones of the white background portions 13c1 may also be referred to as the white zones. The zone of the black background portion 13c2 may also be referred to as the black zone.

Figure 11:
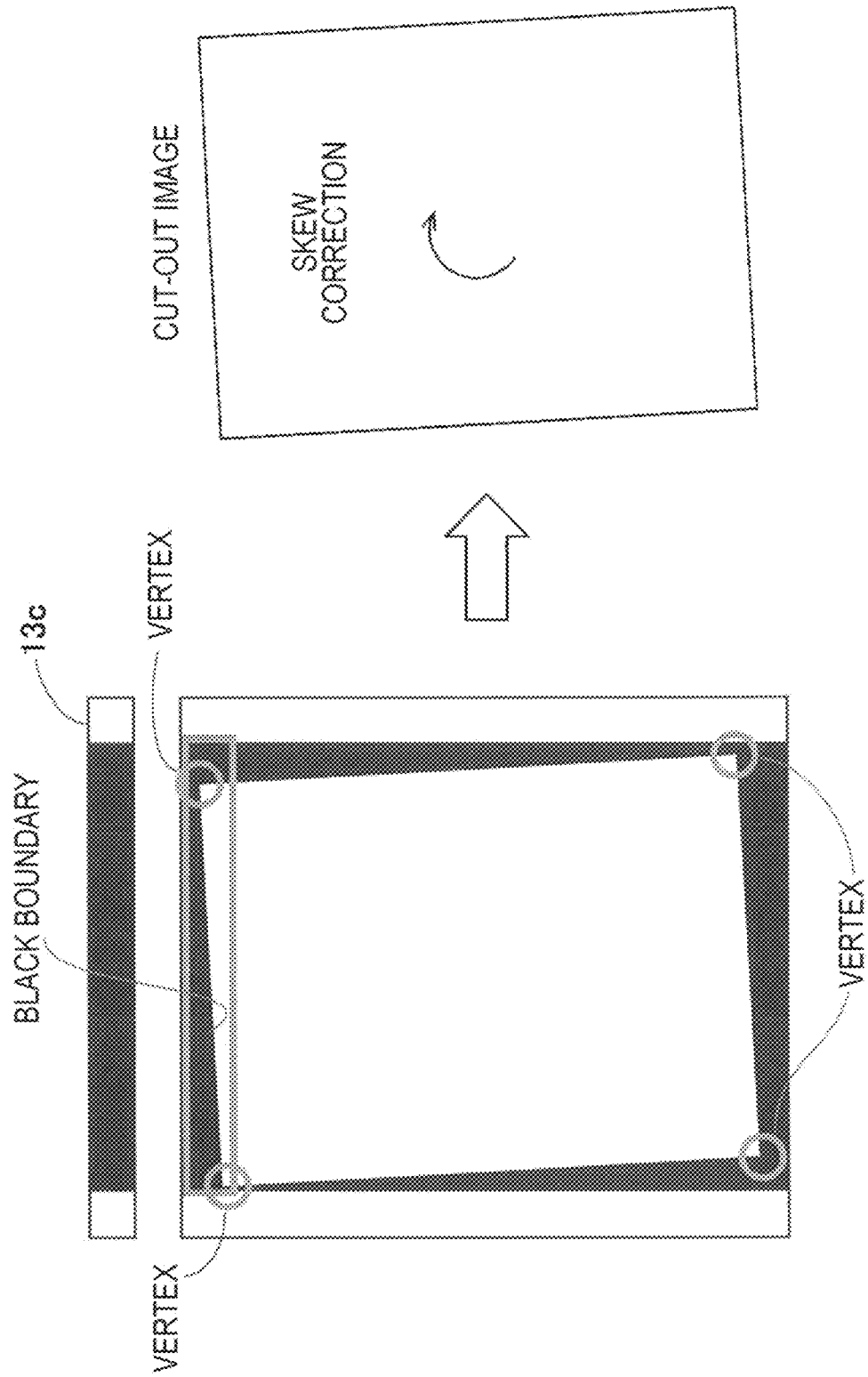
FIG. 11 is a diagram illustrating a first pattern of original copy cutout processing.

FIG. 11 is a diagram illustrating a first pattern of the original copy cutout processing.

1) When the Original Copy G has a Size that Falls within the Black Background Portion 13c2

In this case, four vertices are supposed to be included in the black zone in read image data.

1: Regions where the vertices are formed are extracted from the black zone.
2: When the number of the extracted vertices is equal to 4, straight lines formed by joining the four vertices are specified as a black boundary, and skew of the boundary is sought.
3: Skew correction is performed by using the black boundary of the black background to cut out the image.

As illustrated on the left side of FIG. 11, the entire original copy G is included in the black zone. Accordingly, the image formed by joining the four vertices is cut out and subjected to the skew correction as illustrated on the right side in FIG. 11.

2) When the Original Copy G Overlaps the White Zone of the Background Plate 13c

Figure 12:
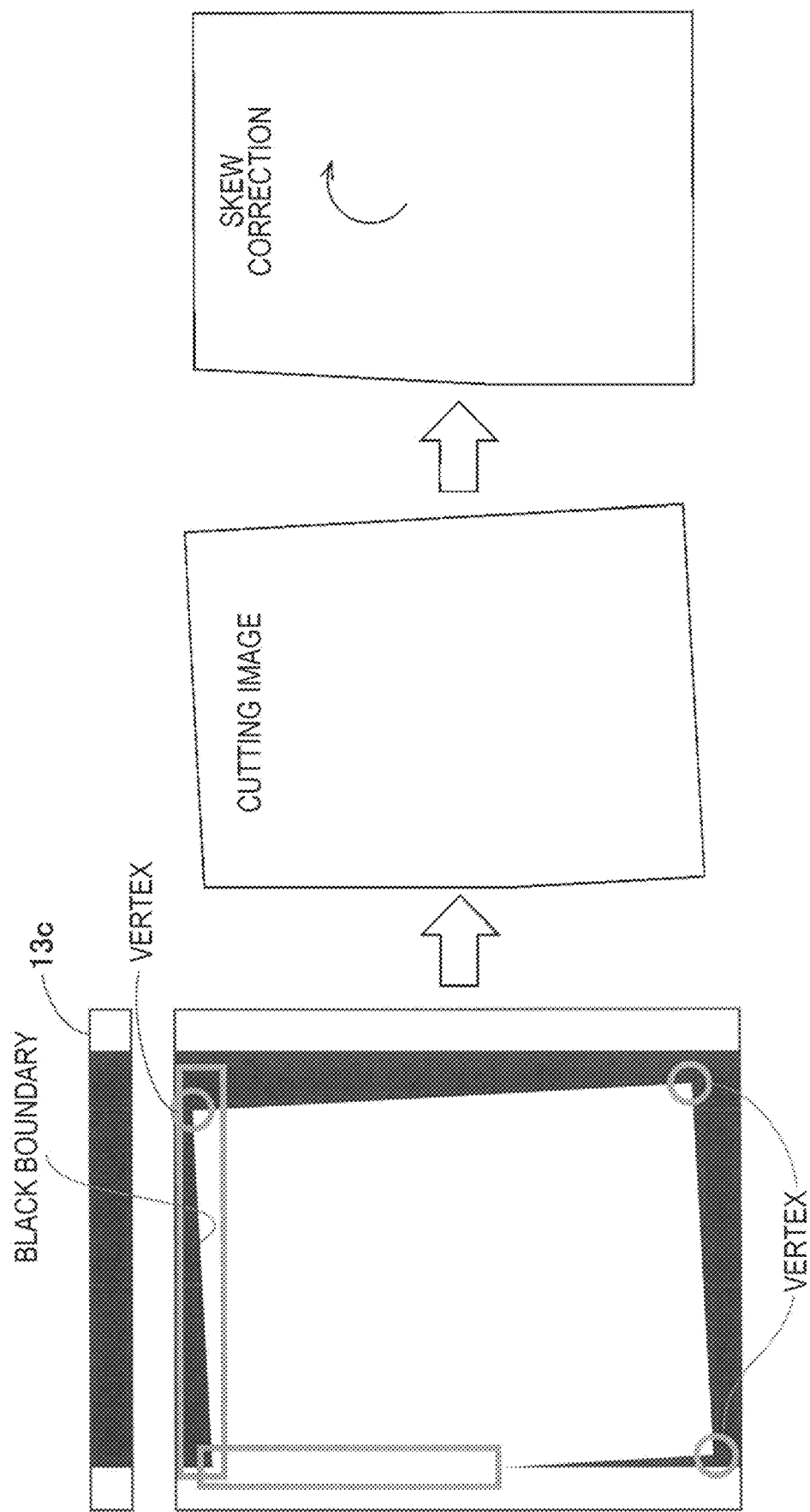
FIG. 12 is a diagram illustrating a second pattern of the original copy cutout processing.

FIG. 12 is a diagram illustrating a second pattern of the original copy cutout processing.

Case 1

1: Regions where the vertices are formed in the black zone are extracted.
2: When the number of the extracted vertices is equal to 3, the black boundary defining an upper side is specified and skew of the boundary is sought.

Two cutting methods are available thereafter.

3-1: Coordinates of the remaining one vertex located in the white zone are sought based on coordinates of the three vertices. The image included in the four vertices is cut out after performing the skew correction. The process of cutting out the image included in the four vertices after performing the skew correction is the same as the method illustrated in FIG. 11.
3-2: The image is cut out while disregarding the portion overlapping the white zone, and is then subjected to the skew correction. Although the image thus cut out has an irregular pentagonal shape, the image is acceptable due to the white background.

As illustrated on the left side of FIG. 12, the three vertices are included in the black zone, and a portion of the image that protrudes to the white region is disregarded as illustrated at the center of FIG. 12 when assuming the four vertices. Hence, only the region included in the black zone is cut out after being subjected to the skew correction as illustrated on the right side in FIG. 12.

As described above, when the three vertices out of the four vertices of the original copy G are present in the black zone, the control unit 15 does not use the read data of the original copy G concerning the portion that runs off the black zone. In this way, it is possible to improve the accuracy to cut out the original copy and to reduce an amount of data at the same time.

Case 2

When there are no vertices in the black zone or when one or two vertices are present in the black zone, it is difficult to accurately cut out the ends of the image because the black zone does not include the three vertices.

Figure 13:
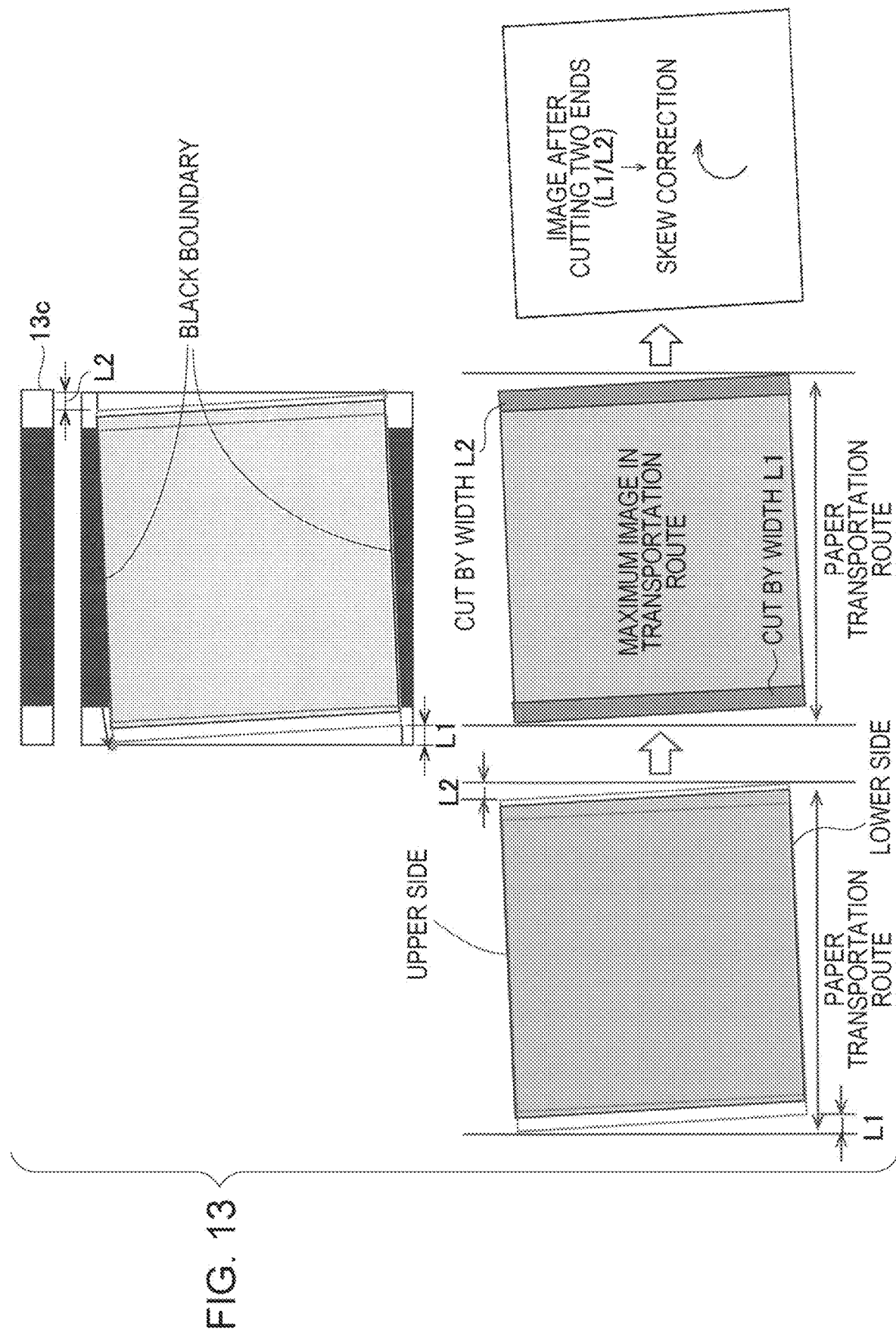
FIG. 13 is a diagram illustrating a third pattern of the original copy cutout processing.

FIG. 13 is a diagram illustrating a third pattern of the original copy cutout processing. As illustrated at the upper stage of the FIG. 13, two sides on the right and left overlap the white zones. Regarding a position of the image, accurate positions of four corners are uncertain because these corners are located in the white regions. Nevertheless, the corners are certainly located within the transportation route.

1: A case where the original copy is displaced to the left end side of the transportation route at the maximum will be assumed. This case is illustrated on the left side at the lower stage of FIG. 13.

2: Assuming that the original copy G is displaced to the left side of the transportation route due to skew of a black boundary constituting an upper side that appears in a region near an upper end in the black zone, it is possible to assume, as one of the vertices, an intersecting point of a line extending the black boundary of the upper side to the left and the left end of the transportation route.

3: It is possible to obtain a length of the image by finding a black boundary constituting a lower side appearing at a region near a lower end in the black zone while defining the assumed intersecting point as one of the vertices with the skew of the black boundary constituting the upper side.

4: After obtaining the length of the image, a lateral side intersecting at 90 degrees with the upper side is assumed by using the vertex of the intersecting point assumed in advance, and a vertex on the left side of the lower side is specified by using the obtained length of the image. Then, a distance L1 from this vertex to the left end of the white zone is specified.

5: Regarding the right end as well, assuming that the original copy G is displaced to the right side of the transportation route based on skew of a black boundary constituting the lower side that appears in a region near a lower end in the black zone, it is possible to assume, as another vertex, an intersecting point of a line extending the black boundary of the lower side to the right and the right end of the transportation route.

6: The intersecting point on the right side of the lower side is defined as the vertex, and another lateral side intersecting at 90 degrees with the lower side is assumed by using the vertex equivalent to the intersecting point. Another vertex on the right side of the upper side is thus specified by using the obtained length of the image. Then, a distance L2 from this vertex to the right end of the white zone is specified.

7: The left side at the lower stage of FIG. 13 illustrates the image surrounded by the four vertices thus specified. As illustrated at the center of FIG. 13, a region having a width equivalent to the length L1 from the left end is cut away regarding the left side and a region having a width equivalent to the length L2 from the right end is cut away regarding the right side.

8: Lastly, the image after cutting the two sides away is subjected to correction of the skew obtained in advance and is then cut out. In this instance, the right and left sides of the image thus cut out may contain the white background. However, the image is acceptable because the background is white.

As described above, the aforementioned image reading apparatus includes the control unit 15 that controls the reading of the image. This control unit 15 creates the correction data for correcting the read data of the original copy G by conducting the above-described operation. Moreover, after reading the image on the original copy G, the data of the image on the original copy is cut out based on the read data of the original copy G in the black zone.

As a consequence, it is possible to improve the accuracy to cut out the original copy by using the simple structure of the background plate in which the portions of one surface that is fixed are used as the white background portions 13c1 and the remaining portion on the same surface is used as the black background portion 13c2.

Moreover, when two vertices or less out of the four vertices of the original copy G are located in the black zone, the control unit 15 specifies the vertex at a rear end or a front end of the original copy G based on the intersecting point of the extension line of an edge portion (the black boundary) at the front end or the rear end of the original copy G that passes through the black zone with an end portion (either a left end or a right end) of the reading region of the image sensor 13e of the reading module being located in the white zone. The control unit 15 is configured not to use the portions of the read data regarding the regions outside the reading region based on the distances L1 and L2 obtained based on such vertices.

As described above, in the background plate 13c, the white background portions 13c1 do not always have to be located on the two ends or the black background portion 13c2 does not always have to be located at the center.

Figure 14:
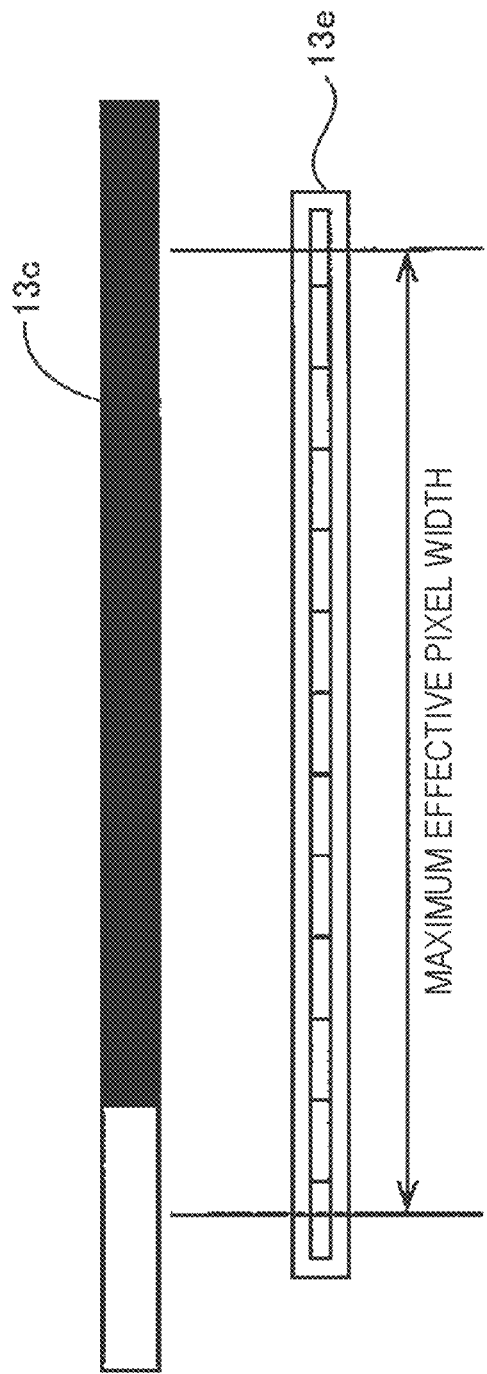
FIG. 14 is a schematic diagram illustrating a background plate and a reading unit of a different example.

FIG. 14 is a schematic diagram illustrating a background plate and a reading unit of a different example.

As illustrated in FIG. 14, as compared to the above-described background plate 13c, the white background portion 13c1 located on the right is eliminated and the black background portion 13c2 is extended to this portion. With respect to the maximum effective pixel width of the image sensor 13e, the reading elements on the left end of the image sensor 13e face the white background portion 13c1 and the reading elements on the right end thereof face the black background portion 13c2.

One end portion of the background plate 13c is white (only on the left side or only on the right side), and the remaining portion of the background plate 13c except the one end portion is black.

When four vertices are included in the black zone regarding the read image data, straight lines formed by joining the four vertices are specified as the black boundary, and the image is cut out while correcting the skew thereof.

Figure 15:
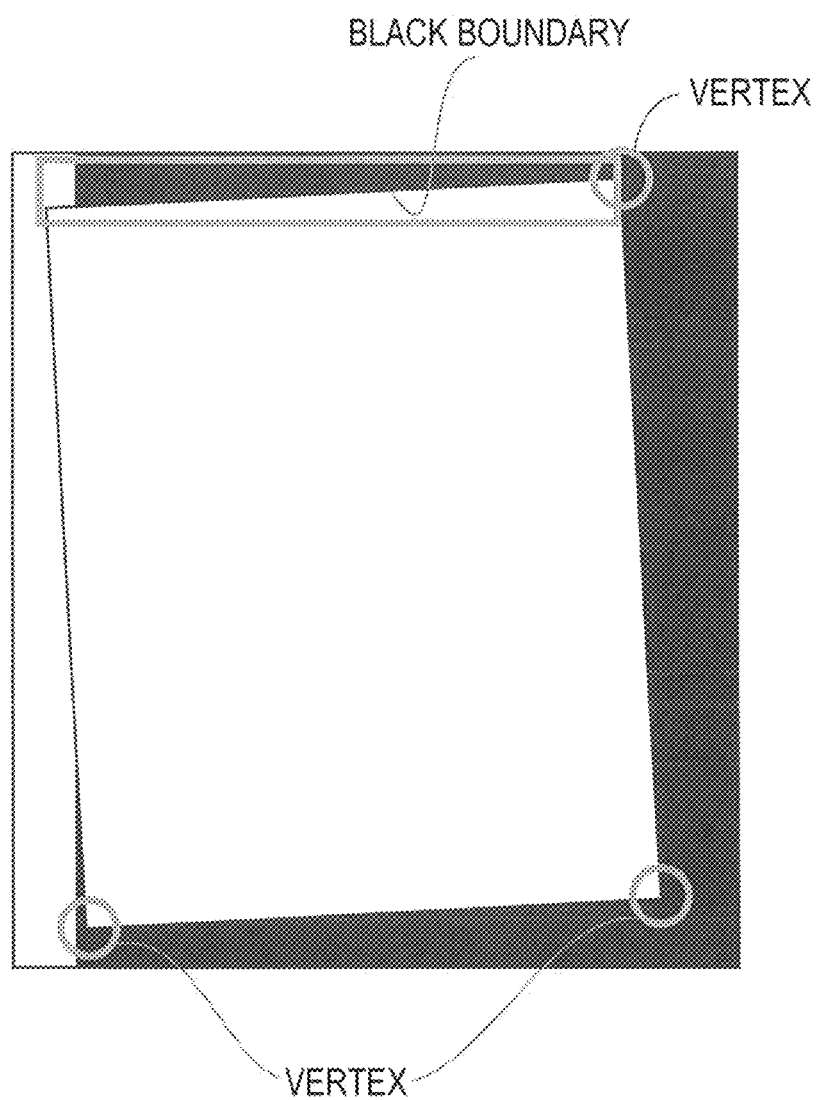
FIG. 15 is a diagram illustrating a fourth pattern of the original copy cutout processing.

When the Original Copy G Overlaps the White Zone of the Background Plate
When there are Three Vertices in the Black Zone FIG. 15 is a diagram illustrating a fourth pattern of the original copy cutout processing.

The original copy cutout in this case is a case where the original copy G overlaps the white zone of the background plate. Thus, the procedures discussed in Case 1 when the three vertices are included in the black zone are applicable.

Figure 16:
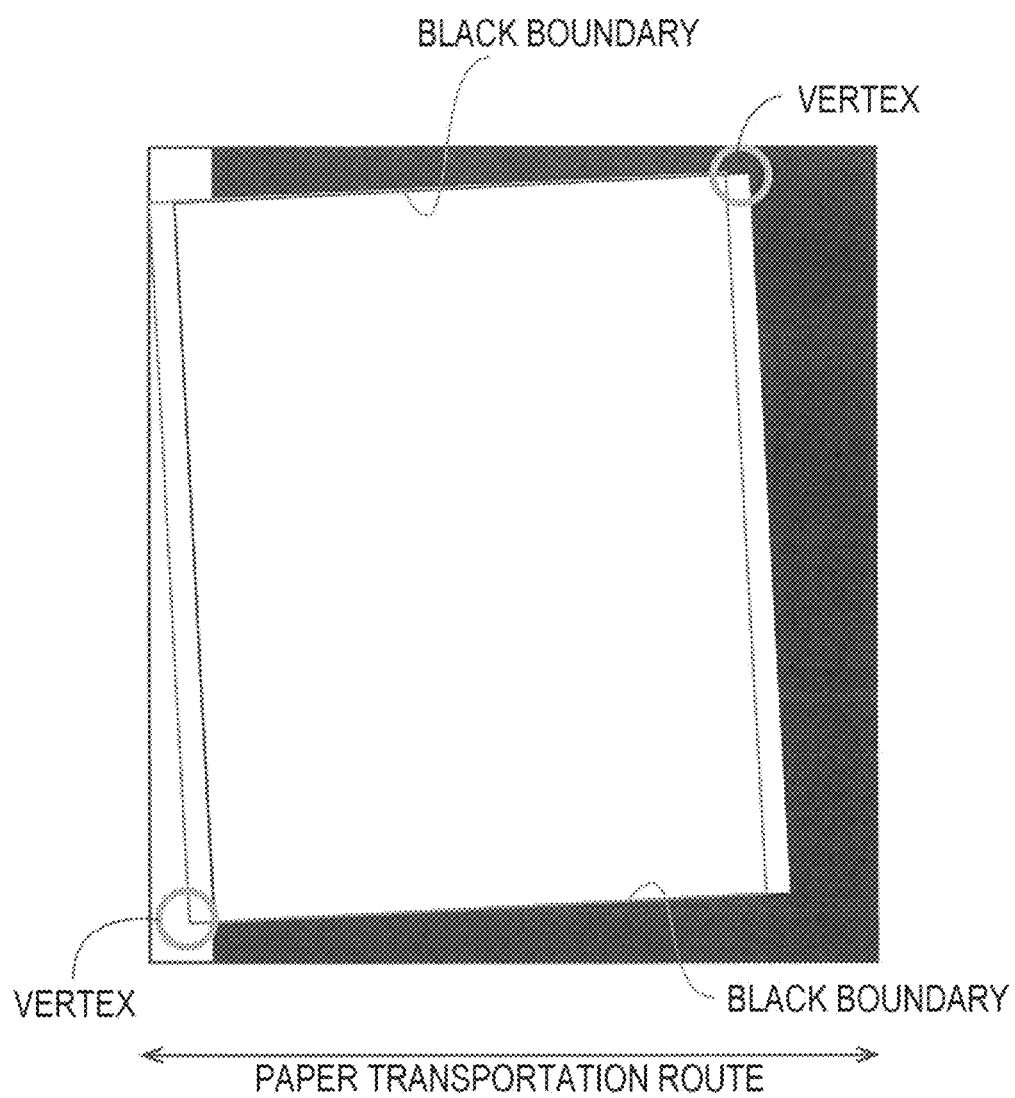
FIG. 16 is a diagram illustrating a fifth pattern of the original copy cutout processing.

FIG. 16 is a diagram illustrating a fifth pattern of the original copy cutout processing.

The original copy cutout in this case is a case where the original copy G overlaps the white zone of the background plate. Thus, the procedures described above in Case 2 when there are no vertices in the black zone or when one or two vertices are present in the black zone are applicable.

Figure 17:
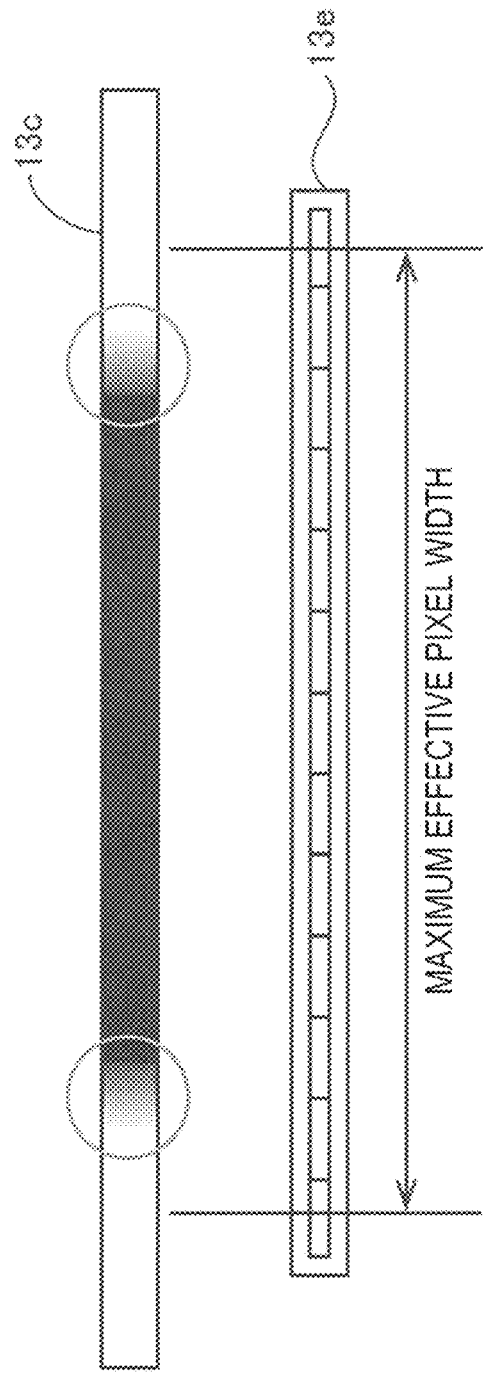
FIG. 17 is a schematic diagram illustrating a background plate and a reading unit of a different example.

FIG. 17 is a schematic diagram illustrating a background plate and a reading unit of a different example.

As illustrated in FIG. 17, as compared to the above-described background plate 13c, boundaries of the white background portions 13c1 located on the right and left with the black background portion 13c2 located in the center are provided with gradation with which it is almost impossible to achieve edge detection in image processing. Since the gradation itself cannot be extracted by the edge detection, an edge portion of an original copy can be detected by the edge detection.

As mentioned above, a gradation background portion configured to gradually change the brightness is provided between each white background portion 13c1 and the black background portion 13c2.

Figure 18:
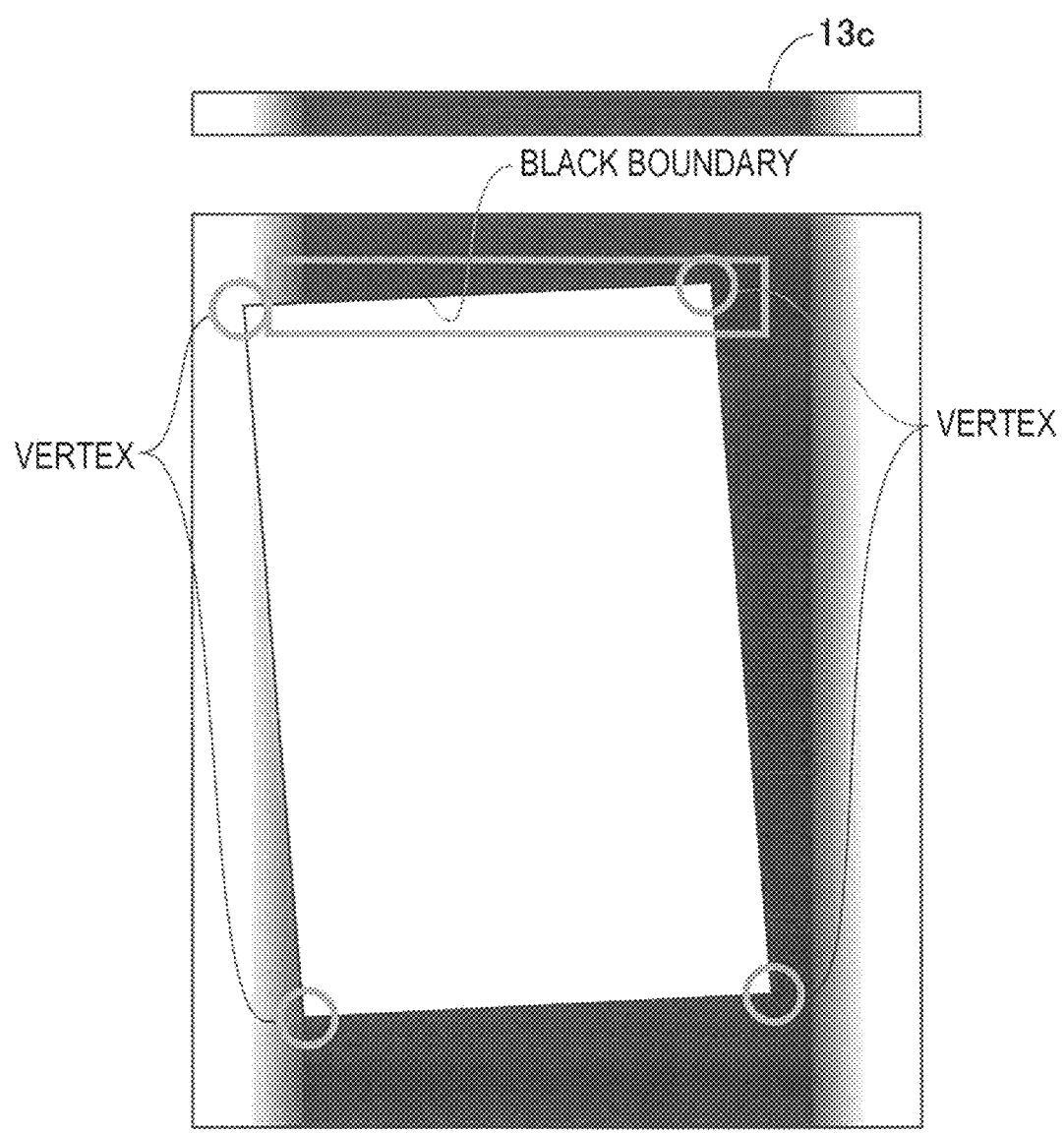
FIG. 18 is a diagram illustrating a sixth pattern of the original copy cutout processing.

FIG. 18 is a diagram illustrating a sixth pattern of the original copy cutout processing.

The image may be simply cut out when there are four vertices in the black zone. Meanwhile, the above-described procedures in Case 1 are applicable when there are three vertices therein.

When the Original Copy Overlaps a Gradation Zone of the Background Plate
When there are Two Vertices in the Black Zone and Two Vertices in the Gradation Zone
1: Skew is sought from a black boundary of an upper side appearing at an upper end region of the black zone.
2: The vertices present in the gradation zone are found.
3: An image is cut out by using the two vertices present in the black zone and the two vertices found by the edge detection. The image is cut out after correcting the skew. As illustrated in FIG. 18, the two vertices on the left side of the original copy G overlap the gradation zone while the two vertices on the right side are present in the black zone. Accordingly, it is possible to specify the four vertices.

When the four vertices of the original copy G completely overlap the white zones of the background plate, the procedures described above in Case 2 when there are no vertices in the black zone or when one or two vertices are present in the black zone are applicable.

Figure 19:
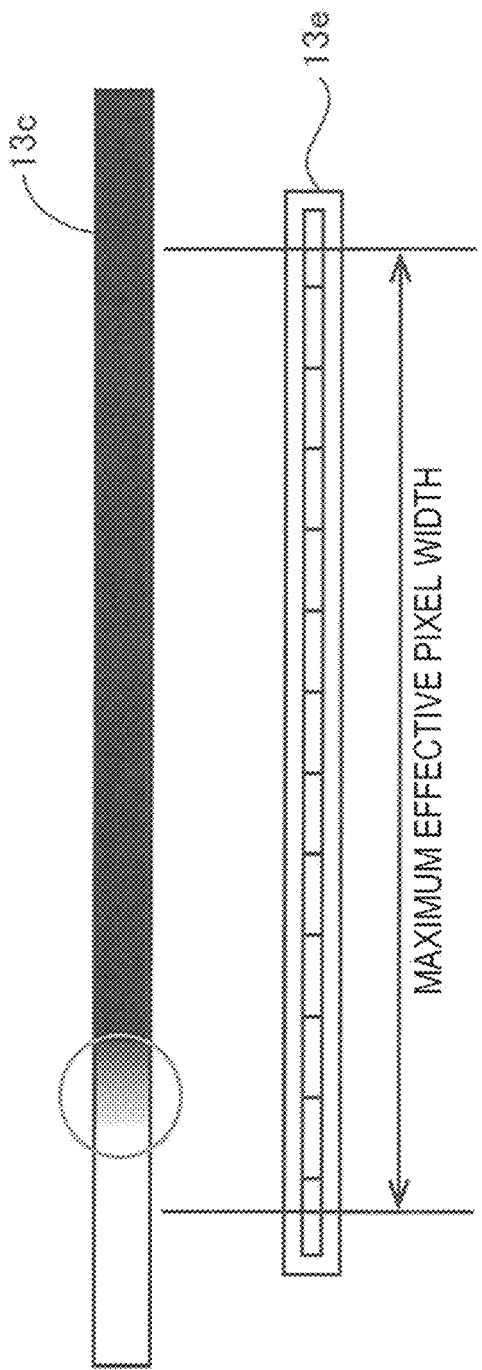
FIG. 19 is a schematic diagram illustrating a background plate and a reading unit of a different example.

FIG. 19 is a schematic diagram illustrating a background plate and a reading unit of a different example.

The background plate 13c illustrated in FIG. 19 corresponds to the background plate 13c illustrated in FIG. 14, in which the one end portion thereof is white (only on the left side or only on the right side) and the remaining portion thereof is black. Here, a boundary between the white background portion 13c1 and the black background portion 13c2 is provided with gradation with which it is almost impossible to achieve the edge detection in the image processing.

When there are vertices in the black zone and in the gradation zone
1: Two vertices are found in the black zone.
2: Two vertices present in the gradation zone are found by the edge detection.
3: Skew is sought from the black boundary of the upper side appearing at the upper end region of the black zone.
4: An image surrounded by the four vertices thus found is cut out after correcting the skew.

When there are Vertices in the White Zone
The procedures described above in Case 2 when there are no vertices in the black zone or when one or two vertices are present in the black zone are applicable.

Figure 20:
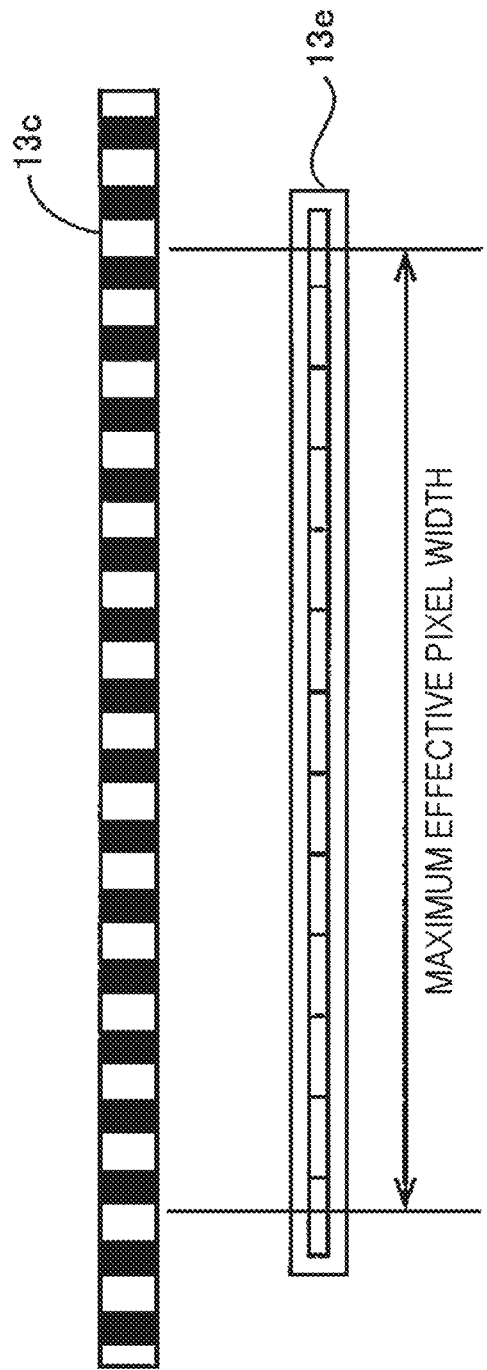
FIG. 20 is a diagram illustrating a background plate and a reading unit of a different example.

FIG. 20 is a schematic diagram illustrating a background plate and a reading unit of a different example.

As illustrated in FIG. 20, the background plate 13c can also be provided with black and white stripes.

As mentioned above, the white background portions 13c1 and the black background portions 13c2 are alternately arranged therein.

Figure 21:
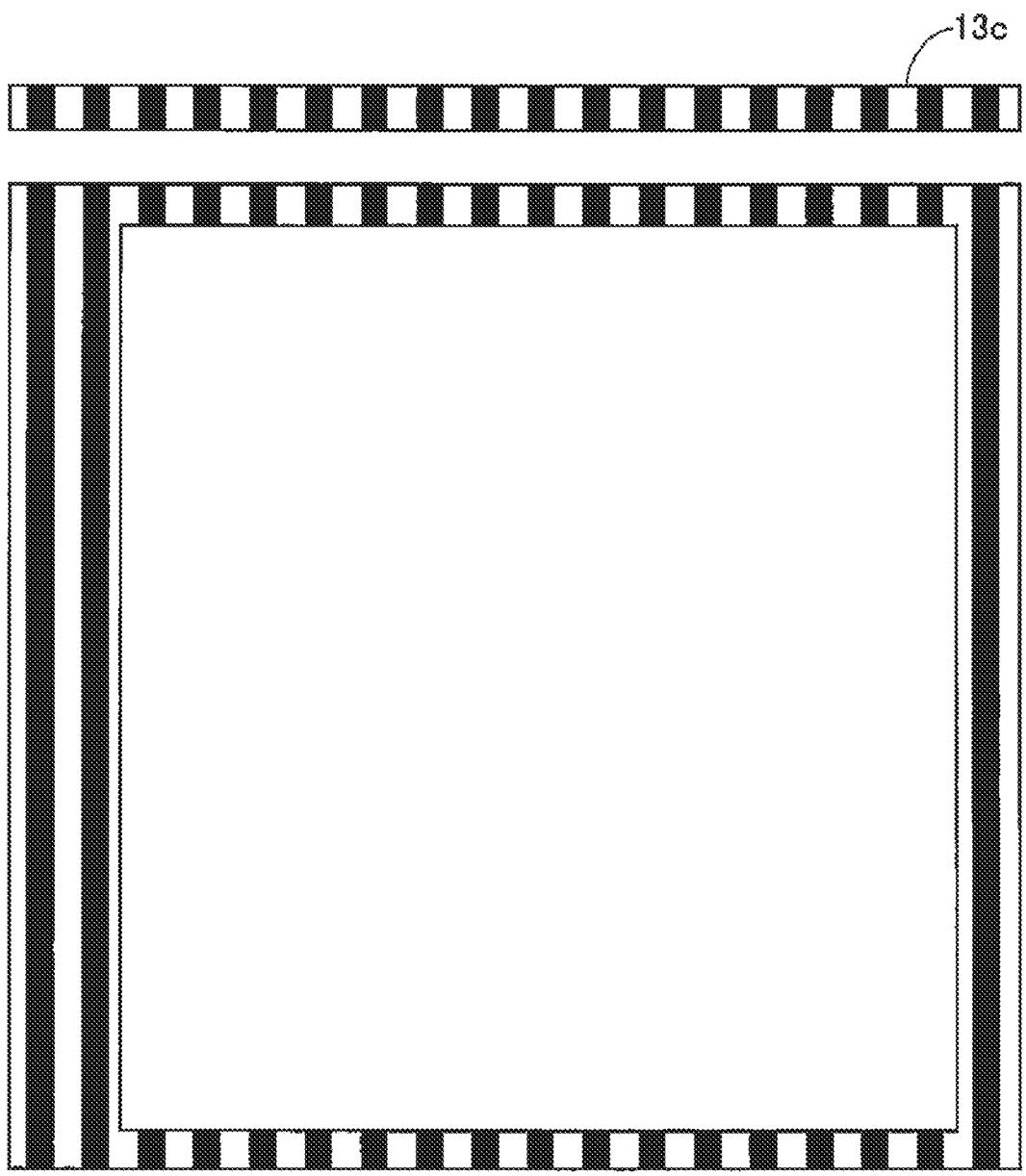
FIG. 21 is a schematic diagram illustrating a seventh pattern of the original copy cutout processing.

FIG. 21 is a diagram illustrating a seventh pattern of the original copy cutout processing.

When there are no vertices in the black zones or when one or two vertices are present in the black zones, the same processing as the procedures in Case 2 when there are no vertices in the black zone or when one or two vertices are present in the black zone may be carried out.

When there are three vertices in the black zones, the original copy G can be subjected to the skew correction and cut out in accordance with the two methods as described above in Case 1.

Figure 22:
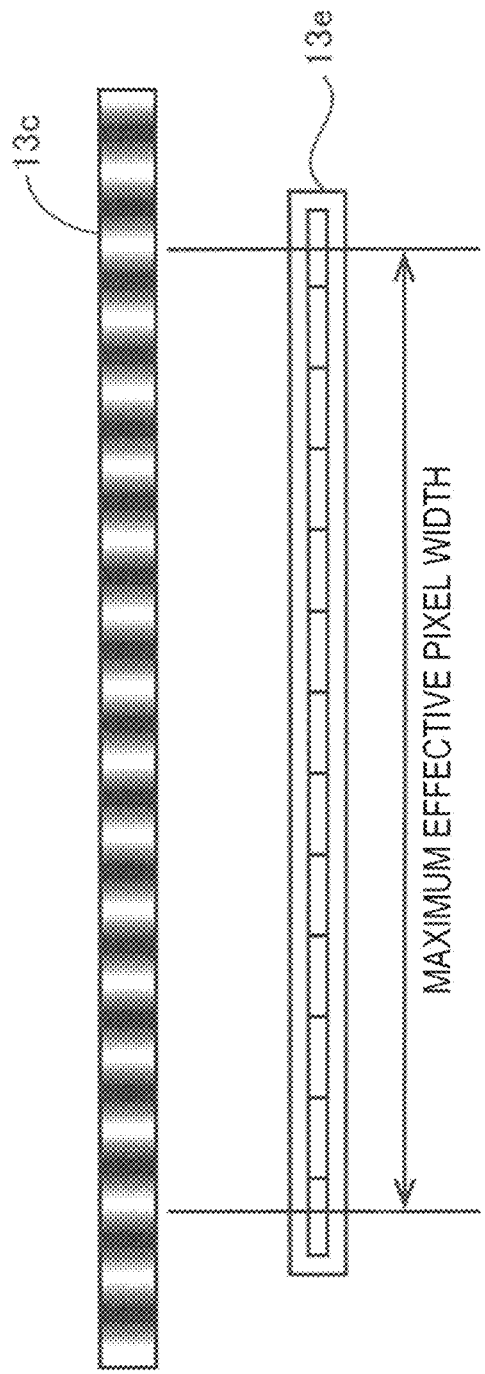
FIG. 22 is a schematic diagram illustrating a background plate and a reading unit of a different example.

FIG. 22 is a schematic diagram illustrating a background plate and a reading unit of a different example.

As illustrated in FIG. 22, the background plate 13c is provided with black and white stripes. In addition, each boundary between the white background portion 13c1 and the black background portion 13c2 is provided with gradation with which it is almost impossible to achieve the edge detection in the image processing.

When there are vertices in the black zones or in the gradation zones
1: Skew is sought from the black boundary of the upper side appearing at the upper end region of the black zones.
2: The vertices present in the gradation zones are found by the edge detection.
3: The vertices are found in the black zones.
4: An image surrounded by the four vertices thus found is cut out after correcting the skew.

When there are vertices in the white zones, the same processing as the procedures described in Case 2 when there are no vertices in the black zone or when one or two vertices are present in the black zone may be carried out.

As described above, preparation of the background plate being provided with the black background portion at the central portion and with the white background portions at the two end portions in the direction of arrangement makes it possible to carry out shading correction and to cut out the image by using the low-cost configuration without having to switch between the white regions and the black region of the background plate. In particular, since the central portion of the background plate is black, this configuration is advantageous in detecting a defect in the original copy.

Aspect 1
The image reading apparatus 10 according to an aspect of the present technique includes: the reading module (13e)

which is the reading module (such as the image sensor 13*e*) provided with the reading elements 30 arranged in the direction D2 of arrangement intersecting the direction D1 of transportation of the original copy G and configured to read the image on the transported original copy G; the illumination unit 20 that illuminates a reading range AR1 by the reading module (13*e*) with light LT1; the background plate 13*c* facing the reading elements 30 at a position illuminated with the light LT1; the storage unit (such as the non-volatile memory 17) configured to store the information; and the control unit 15 configured to control the reading of the image. The reading module (13*e*), the illumination unit 20, and the background plate 13*c* are disposed at positions fixed in the direction D1 of transportation. As exemplified in FIG. 25 and the like, the background plate 13*c* includes the white background portion 13*c*1 for shading correction and the black background portion 13*c*2 for cutting out the original copy, which has the lower brightness than that of the white background portion 13*c*1. As exemplified in FIG. 24, the illumination unit 20 includes the light source (such as the LEDs 13*d*) located on one of outer sides of the reading elements 30 in the direction D2 of arrangement, and a light guide 23 that guides the light LT1 from the light source (13*d*) to the reading range AR1. As exemplified in FIG. 25 and the like, the white background portion 13*c*1 is located at a more distant position from the light source (13*d*) in the direction D2 of arrangement than the black background portion 13*c*2 is. The storage unit (17) stores background plate reference difference data (such as the background plate RAW data GR'–BK) representing a difference between read data (such as virtual background plate read data GR') of the background plate 13*c* illuminated with the light LT1 on the assumption that the black background portion 13*c*2 is the white background portion 13*c*1 and read data (such as the black reference read data BK) of the background plate 13*c* not illuminated with the light LT1. The storage unit (17) also stores white reference difference data (such as the white reference RAW data WH–BK) representing a difference between read data (such as the white reference read data WH) of the white reference chart illuminated with the light LT1 in the state where the white reference chart is disposed in the range for reading the image (such as a maximum effective pixel width W1) and the read data (BK) of the background plate 13*c* not illuminated with the light LT1.

Figure 30:
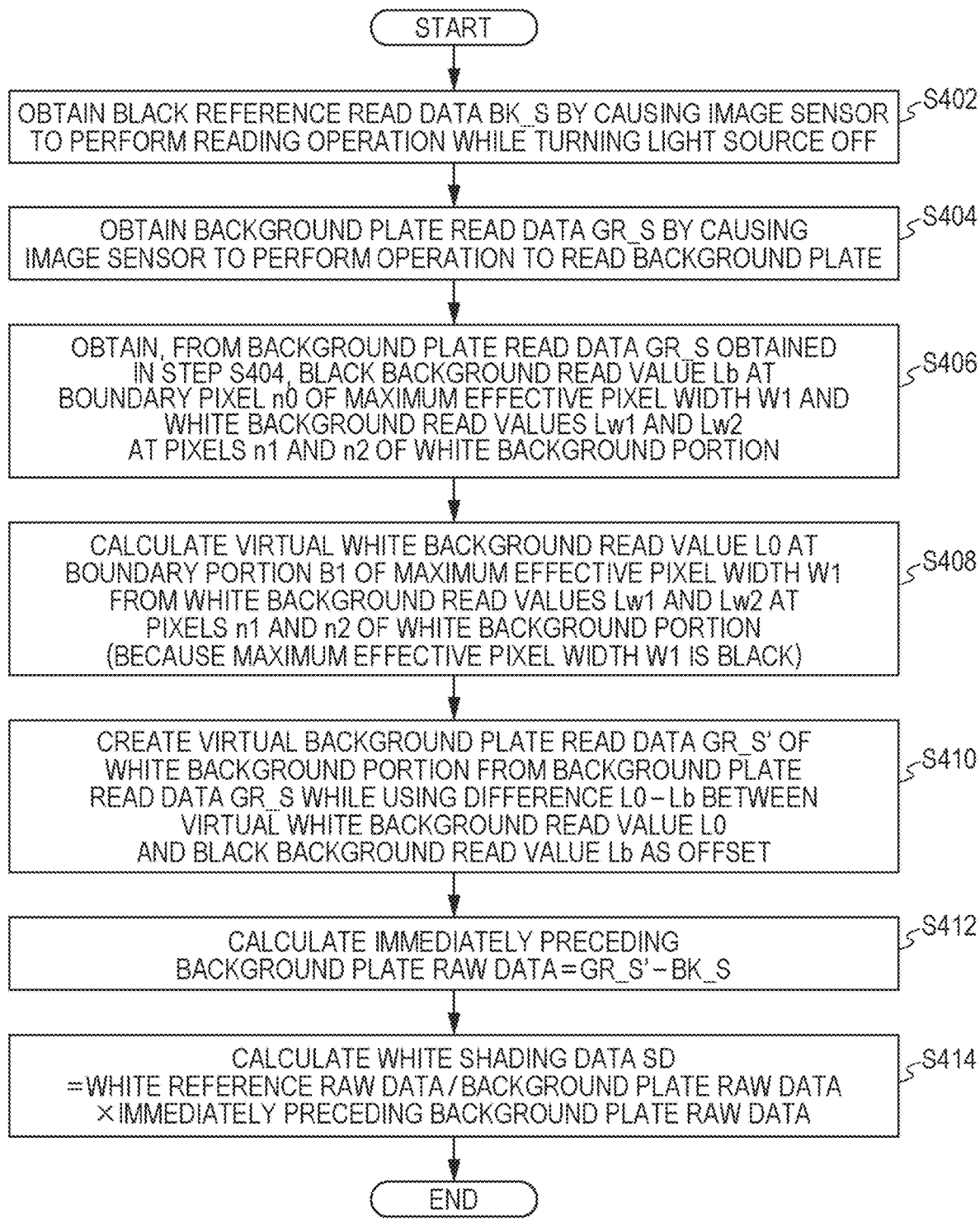
FIG. 30 is a flowchart schematically illustrating white shading correction processing.

As exemplified in FIG. 30, the control unit 15 obtains the black reference read data BK_S, which represents the read data of the background plate 13*c* not illuminated with the light LT1, from the reading module (13*e*). The control unit 15 obtains the background plate read data GR_S, which represents the read data of the background plate 13*c* illuminated with the light LT1, from the reading module (13*e*). As exemplified in FIGS. 28 and 30, the control unit 15 obtains the following values from the background plate read data GR_S, namely, a black background read value Lb at a specific position (such as a pixel n0) which is located closer to an end portion 13*c*4 on the white background portion side than to an end portion 13*c*3 on the light source side out of the two ends in the direction D2 of arrangement of the black background portion 13*c*2, and white background read values Lw1 and Lw2 at reading positions (such as pixels n1 and n2) in the white background portion 13*c*1 in the direction D2 of arrangement. Based on the white background read values Lw1 and Lw2, the control unit 15 obtains a virtual white background read value L0, which is assumed to be the read value at the specific position (n0) on the hypothesis that the specific position (n0) is in the white background portion 13*c*1. Based on a difference between the black background read value Lb and the virtual white background read value L0, the control unit 15 converts the background plate read data GR_S into virtual background plate read data GR_S' corresponding to the read data of the white background portion 13*c*1. The control unit 15 obtains correction data (such as white shading data SD) for shading correction based on a difference between the virtual background plate read data GR_S' and the black reference read data BK_S, the background plate reference difference data (GR'–BK), and the white reference difference data (WH–BK).

In the above-described aspect, virtual background plate read data GR_S' on the assumption that the black background portion 13*c*2 is the white background portion 13*c*1 is obtained from the read data (GR_S) of the background plate 13*c* including the black background portion 13*c*2 and the white background portion 13*c*1, and the correction data (SD) for shading correction is obtained. Accordingly, the above-described aspect can provide the image reading apparatus which does not require the mechanism for switching between the white background for shading correction and the black background for cutting out the original copy. As a consequence, this configuration leads to a decrease in the number of components of the image reading apparatus.

Here, the expression "white" in the white background portion and the expression "black" in the black background portion are terms used for descriptive purposes in order to express high brightness and low brightness, and these colors are not limited to pure white and pure black. In this regard, the white background portion for shading correction only needs to have higher brightness than that of the black background portion for cutting out the original copy, and the color of the white background portion is not limited to pure white but may be gray instead. The black background portion for cutting out the original copy only needs to have lower brightness than that of the white background portion for shading correction, and the color of the black background portion is not limited to pure black.

The background plate reference difference data is not limited only to the difference between the read data of the background plate illuminated with the light and the read data of the background plate not illuminated with the light. Instead, the background plate reference difference data may be a combination of the "read data of the background plate illuminated with the light" and the "read data of the background plate not illuminated with the light".

The white reference difference data is not limited only to the difference between the read data of the white reference chart illuminated with the light and the read data of the background plate not illuminated with the light. Instead, the white reference difference data may be a combination of the "read data of the white reference chart illuminated with the light" and the "read data of the background plate not illuminated with the light".

The reading positions in the white background portion may be two positions or equal to or more than three positions.

Note that the above-mentioned remarks will also be applied to the following aspects.

Aspect 2

Figure 28:
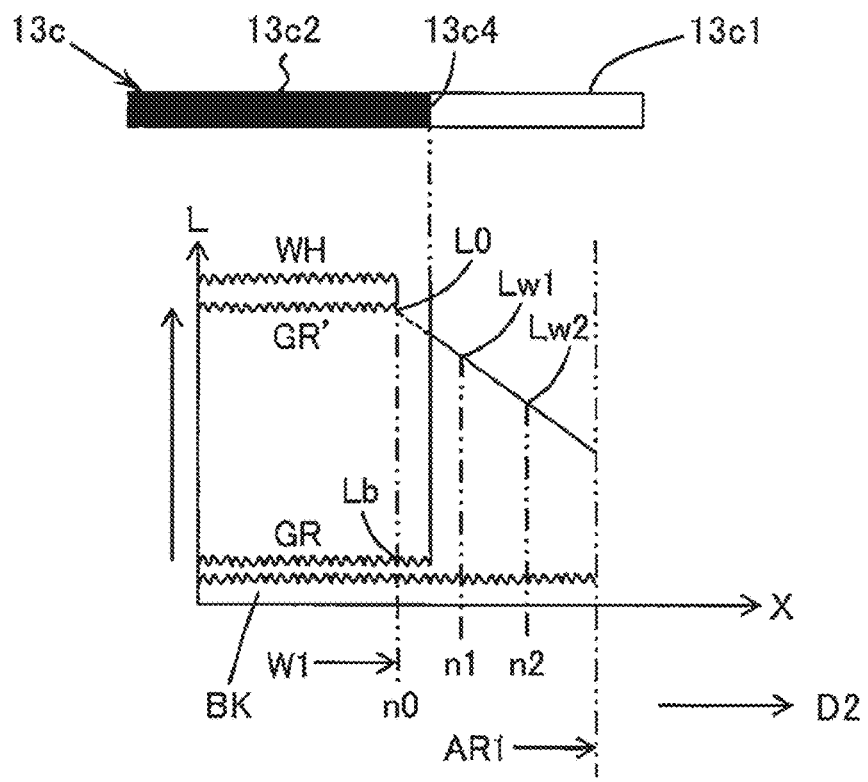
FIG. 28 is a diagram schematically illustrating an example of converting, based on a difference between a black background read value and a virtual white background read value, the background plate read data into the virtual background plate read data.

As exemplified in FIG. 28, the control unit 15 may obtain the virtual white background read value L0 at the specific position (n0) by performing approximate calculation (such as primary approximation) based on relations of the white background read values Lw1 and Lw2 with the reading positions (n1, n2) in the direction D2 of arrangement. This aspect can obtain the virtual white background read value L0 while taking into account the positional relations of the light source (13d) with the reading positions. Thus, it is possible to provide the image reading apparatus that can perform shading correction more accurately.

Aspect 3

The control unit 15 may carry out processing to obtain the correction data (SD) at least at one of a point before reading the original copy G and a point when the image reading apparatus 10 is powered on. This aspect can provide the image reading apparatus suitable for carrying out shading correction.

Aspect 4

Figure 25:
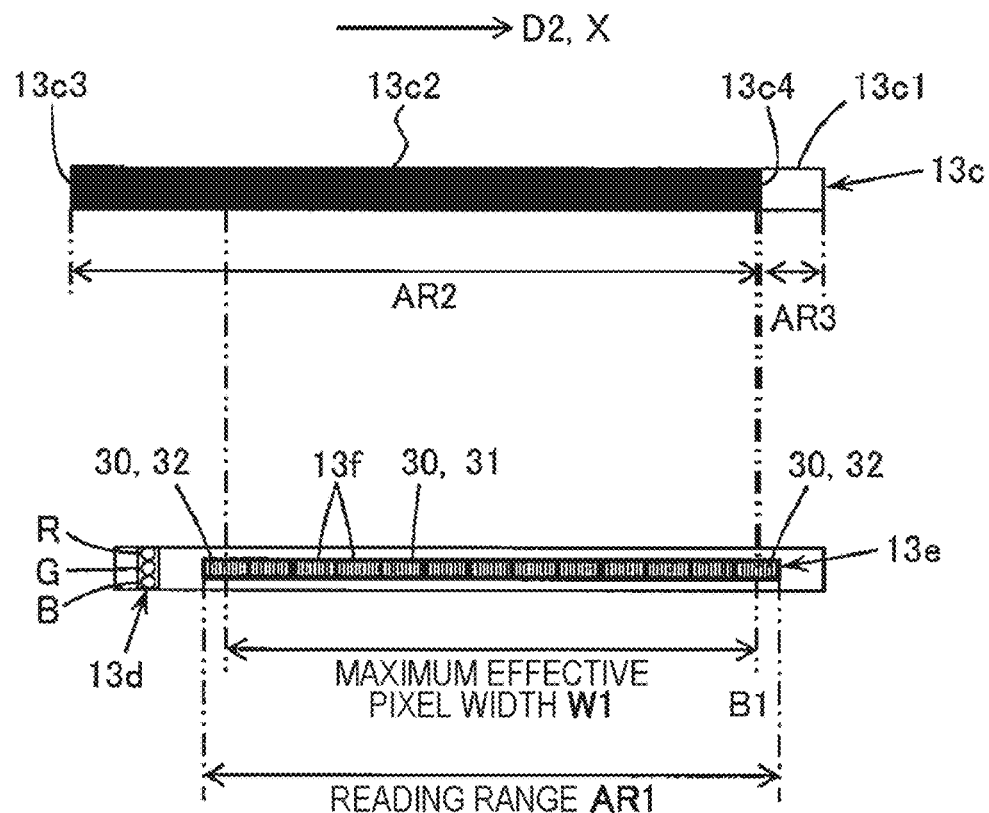
FIG. 25 is a diagram schematically illustrating an example of positional relations of reading elements arranged in a direction of arrangement with a background plate in which a white background portion is located at a position more distant from a light source in the direction of arrangement than a black background portion is.

As exemplified in FIG. 25, the reading elements 30 may include first elements 31 which are present in a maximum range for reading the image (such as the maximum effective pixel width W1) in the direction D2 of arrangement, and second elements 32 which are present outside of the maximum range (W1) in the direction D2 of arrangement. The first elements 31 may be located in a range AR2 of the black background portion 13c2 in the direction D2 of arrangement.

In the above-mentioned case, it is possible to cut out the image accurately since the maximum range (W1) for reading the image is located in the range AR2 of the black background portion 13c2 in the direction D2 of arrangement. Moreover, since the white background portion 13c1 is located outside the maximum range (W1) for reading the image in the direction D2 of arrangement, it is possible to suppress an increase in size of the image reading apparatus in the direction of arrangement.

Aspect 5

As exemplified in FIGS. 25, 28, and the like, the specific position (n0) may be a position at a boundary portion B1 of the maximum range (W1) in the direction D2 of arrangement. This aspect can obtain the virtual white background read value L0 at the position of the boundary portion B1 which is close to the reading position of the white background portion 13c1 in the maximum range (W1) for reading the image in the direction D2 of arrangement. Thus, it is possible to provide the image reading apparatus that can perform shading correction more accurately.

Aspect 6

As exemplified in FIGS. 25, 28, and the like, in the direction D2 of arrangement, a range of the reading elements 30 facing the background plate 13c may be smaller than a total range of the black background portion 13c2 and the white background portion 13c1 (such as a sum of ranges AR2 and AR3). In the direction D2 of arrangement, a range of the first elements 31 facing the black background portion 13c2 may be smaller than the range AR2 of the black background portion 13c2. In the direction D2 of arrangement, a range of the second elements 32 facing the background plate 13c may be a range at least including part of the white background portion 13c1. This aspect can provide a suitable example of the image reading apparatus that does not require the mechanism for switching between the white background for shading correction and the black background for cutting out the original copy.

Aspect 7

As exemplified in FIG. 30, a method of creating correction data according to an aspect of the present technique is a method of creating correction data for the image reading apparatus 10 provided with the reading module (13e), the illumination unit 20, the background plate 13c, and the storage unit (17). The method includes the following steps (A1) to (A6):

(A1) A first step (such as step S402) of obtaining the black reference read data BK_S, which is the read data of the background plate 13c not illuminated with the light LT1, from the reading module (13e);

(A2) A second step (such as step S404) of obtaining the background plate read data GR_S, which is the read data of the background plate 13c illuminated with the light LT1, from the reading module (13e);

(A3) A third step (such as step S406) of obtaining, from the background plate read data GR_S, the black background read value Lb at the specific position (n0) located closer to the end portion 13c4 on the white background portion side than to the end portion 13c3 on the light source side out of the two ends in the direction D2 of arrangement of the black background portion 13c2, and the white background read values Lw1 and Lw2 at the reading positions (n1, n2) in the white background portion 13c1 in the direction D2 of arrangement;

(A4) A fourth step (such as step S408) of obtaining, based on the white background read values Lw1 and Lw2, the virtual white background read value L0, which is assumed to be the read value at the specific position (n0) on the hypothesis that the specific position (n0) is in the white background portion 13c1;

(A5) A fifth step (such as step S410) of converting, based on the difference between the black background read value Lb and the virtual white background read value L0, the background plate read data GR_S into the virtual background plate read data GR_S' corresponding to the read data of the white background portion 13c1; and (A6) A sixth step (such as steps S412 and S414) of obtaining the correction data (SD) for shading correction based on the difference between the virtual background plate read data GR_S' and the black reference read data BK_S, the background plate reference difference data (GR'−BK), and the white reference difference data (WH−BK).

The above-described aspect can provide the method of creating correction data which does not require the mechanism for switching between the white background for shading correction and the black background for cutting out the original copy.

Moreover, the present technique is also applicable to an image reading system including the above-described image reading apparatus, the above-described method of creating correction data, a control program for the above-described image reading apparatus, a computer readable medium recording the control program, and the like. The above-described image reading apparatus may be formed from distributed components.

2. SPECIFIC EXAMPLE OF IMAGE READING APPARATUS CAPABLE OF ADOPTING PRESENT TECHNIQUE

The image reading apparatus 10 illustrated in FIGS. 1 to 3 can adopt the present technique and the explanations that have already done will therefore be omitted. Here, details of the image reading apparatus 10 will be described with reference to FIG. 23 and so forth.

Figure 23:
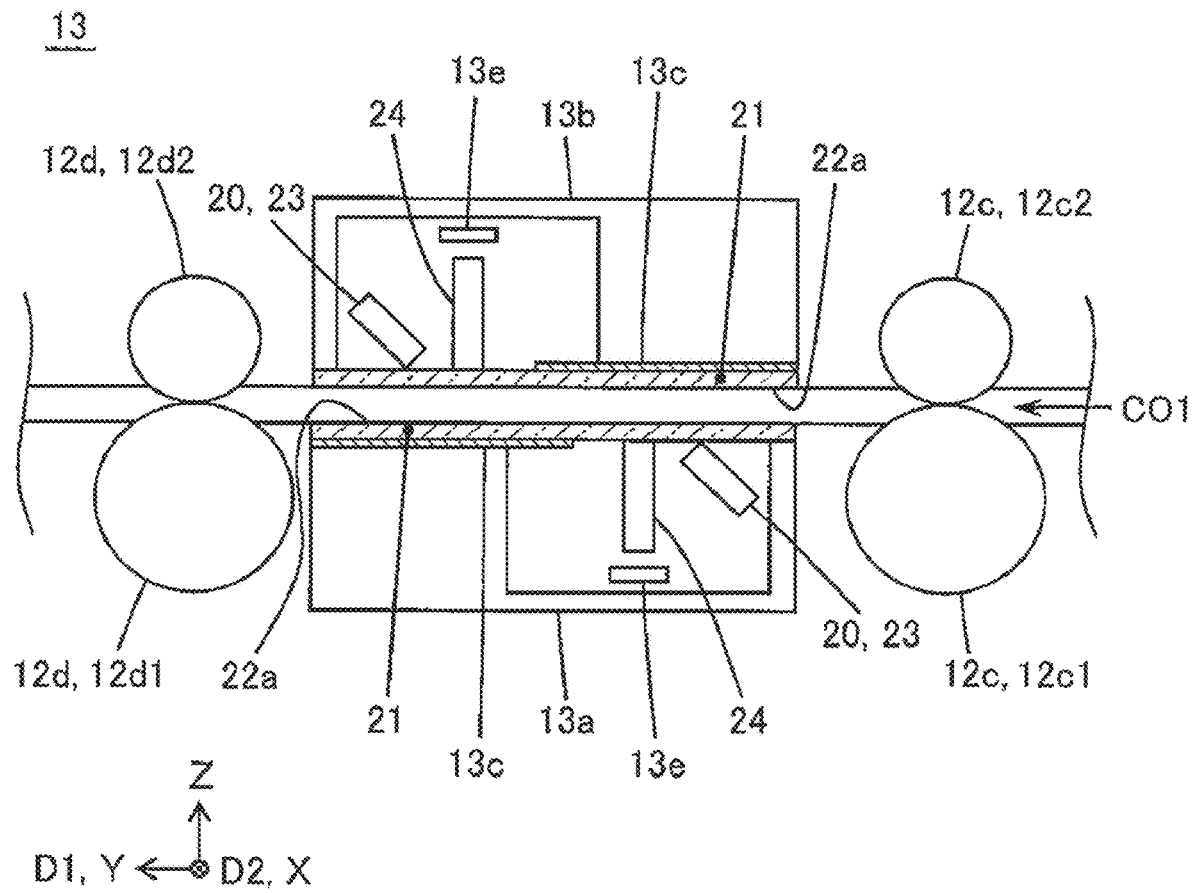
FIG. 23 is a diagram schematically illustrating a configuration example of the reading unit.
Figure 24:
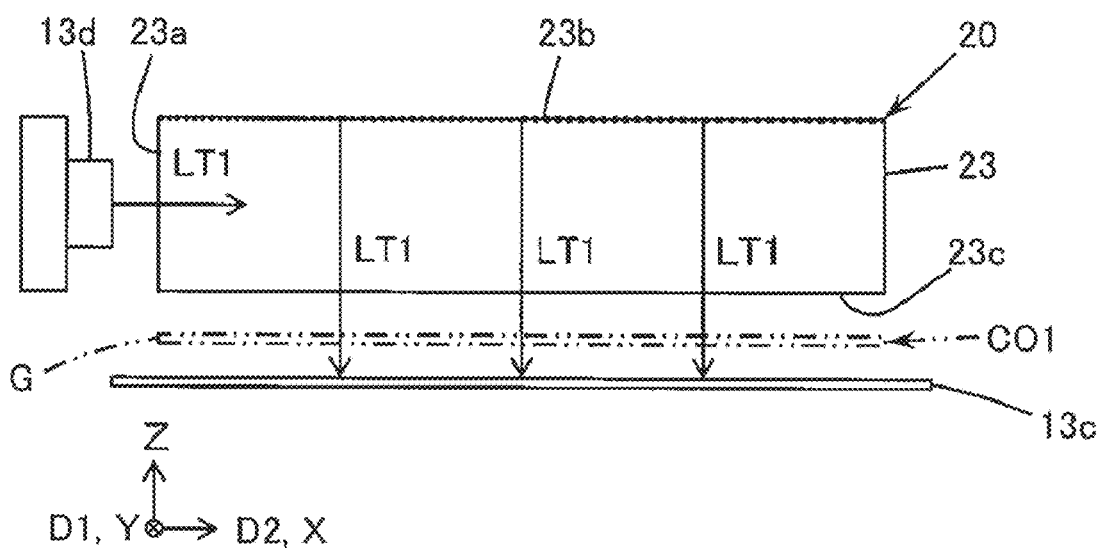
FIG. 24 is a diagram schematically illustrating a configuration example of an illumination unit.

FIG. 23 schematically exemplifies the configuration of the reading unit 13 together with the configurations of the pairs of transportation rollers 12c and discharge rollers 12d. The pair of transportation rollers 12c include a transportation driving roller 12c1 and a transportation driven roller 12c2. The pair of discharge rollers 12d include a discharge driving roller 12d1 and a discharge driven roller 12d2. FIG. 24 schematically exemplifies the configuration of the illumination unit 20 included in the reading unit 13. FIG. 25 schematically exemplifies positional relations of the reading elements 30 arranged in the direction D2 of arrangement with the background plate 13c in which the white background portion 13c1 is located at a position more distant from the LEDs 13d in the direction of arrangement D2 than the black background portion 13c2 is. Note that the reading subunit 13a on a lower side and the reading subunit 13b on an upper side have structures that are point-symmetric to each other in FIG. 23, and basic configurations thereof are the same. Accordingly, a description will be given below while focusing on the configuration of the reading subunit 13b on the upper side.

The reading subunit 13b includes a transparent plate 21, the background plate 13c, the illumination unit 20, a lens 24, and the image sensor 13e. As illustrated in FIGS. 24 and 25, the illumination unit 20 includes the LEDs 13d located on one of the outer sides of the reading elements 30 in the direction D2 of arrangement, and the light guide 23 that guides the light LT1 from the light LEDs 13d to the reading range AR1 to be read by the image sensor 13e. The reading subunit 13b has an elongate shape in the direction D2 of arrangement, and each of the transparent plate 21, the background plate 13c, the light guide 23, the lens 24, and the image sensor 13e has an elongate shape in the direction D2 of arrangement. The reading subunit 13b that includes the background plate 13c, the illumination unit 20, and the image sensor 13e is disposed at the positions fixed in the direction D1 of transportation. The illumination unit 20 configured to illuminate the reading range AR1 with the light LT1 illuminates the transported original copy G with the light LT1, and the image sensor 13e reads the image on the transported original copy G.

The transparent plate 21 can be formed from colorless and transparent glass, a resin plate such as a colorless and transparent acrylic resin plate, or the like. An outer surface of the transparent plate 21, that is, a surface facing the reading subunit 13a on the lower side serves as a reading surface used for reading the original copy G, and constitutes a transportation route CO1 for the original copy G.

The background plate 13c faces the reading elements 30 of the reading subunit 13a at a position to be illuminated with the light LT1 from the illumination unit 20 located in the reading subunit 13a on the lower side opposed thereto. The background plate 13c is read by the reading elements 30 of the reading subunit 13a for the purpose of shading correction. The surface of the background plate 13c facing the reading subunit 13a on the lower side constitutes a reading reference surface 22a. As illustrated in FIG. 25, the reading reference surface 22a of the background plate 13c includes the white background portion 13c1 for shading correction and the black background portion 13c2 having the lower brightness than that of the white background portion 13c1 and used for cutting out the original copy. The black background portion 13c2 and the white background portion 13c1 are arranged in the direction D2 of arrangement, and the white background portion 13c1 is located at a position more distance in the direction D2 of arrangement from the LEDs 13d than the black background portion 13c2 is. A length in the direction D2 of arrangement of the black background portion 13c2 is larger than a length in the direction D2 of arrangement of the white background portion 13c1. The area of the black background portion 13c2 is larger than the area of the white background portion 13c1.

As illustrated in FIG. 24, the LEDs 13d face an incident end 23a being one end of the light guide 23 of which a longitudinal direction is aligned with the direction D2 of arrangement, and emit the light LT1 toward the incident end 23a. As illustrated in FIG. 25, the LEDs 13d may include three types of LEDs, namely, LEDs that emit red (R) light, LEDs that emit green (G) light, and LEDs that emit blue (B) light.

The light guide 23 is an elongate optical guide member used for illuminating the original copy G or the background plate 13c with the light LT1. As illustrated in FIG. 24, the light guide 23 guides the light LT1 emitted in the direction D2 of arrangement from the LEDs 13d toward the reading subunit 13a on the lower side opposed thereto. The light LT1 from the LEDs 13d is incident on the incident end 23a of the light guide 23. The light LT1 is outputted from an outgoing surface 23c of the light guide 23, which faces the reading subunit 13a on the lower side. A reflecting surface 23b of the light guide 23 located on the opposite side from the outgoing surface 23c is formed into a rough surface which is gradually roughened with distance in the direction D2 of arrangement from the LEDs 13d, so as to render the light LT1 outputted from the outgoing surface 23c substantially uniform. The light LT1 which enters the light guide 23 from the incident end 23a is diffusely reflected from the reflecting surface 23b and is outputted from the outgoing surface 23c. The light emitted from the light guide 23 toward the reading subunit 13a on the lower side is reflected from the original copy G or the background plate 13c of the reading subunit 13a, thus reaching the image sensor 13e through the lens 24 and being measured with the image sensor 13e.

The image sensor 13e includes the numerous reading elements 30 which are photoelectric conversion elements. Although a placement density of the reading elements 30 is not limited, the density can be set in a range corresponding to 300 to 600 dpi, for example. The reading elements 30 can adopt photodiodes, for example. One reading element 30 corresponds to one pixel. The image sensor 13e outputs a reading result obtained by measurement with the respective reading elements 30 to the control unit 15. An image sensor of the contact image sensor mode (abbreviated as the CIS mode), an image sensor of the charge-coupled device mode (abbreviated as the CCD mode), or the like can be used as the image sensor 13e. Moreover, it is also possible to use, as the image sensor 13e, a CMOS image sensor, a solid-state image sensing device such as a line sensor and an area sensor formed from the CCD, and so forth. Here, CMOS stands for complementary metal-oxide semiconductor.

The image sensor 13e illustrated in FIG. 25 includes the sensor chips 13f that are arranged in the direction D2 of arrangement. Each sensor chip 13f includes the reading elements 30 arranged in the direction D2 of arrangement. In this way, the image sensor 13e holds the numerous reading element 30, which are present across the wide reading range AR1 that exceeds the maximum effective pixel width W1 being equivalent to a standard size defined in ISO 216 plus margins in the direction D2 of arrangement. Here, the ISO stands for International Organization for Standardization. The standard size is, for example, any of A4 size and A3 size. The margins bring about such a size that allows skewing of the original copy G to be transported. The reading range AR1 represents the maximum range in the direction D2 of arrangement for reading the background plate 13c with the reading elements 30. The maximum effective pixel width W1 represents the maximum range in the direction D2 of arrangement for reading the image in the original copy G with the image sensor 13e. The maximum effective pixel width W1 is slightly smaller than the reading range AR1. The maximum effective pixel width W1 is a predetermined range defined by adding margins to the aforementioned standard size.

In the direction D2 of arrangement, the range of the reading elements 30 facing the background plate 13c is smaller than the ranges AR2 and AR3, which are the total of the black background portion 13c2 and the white background portion 13c1. Here, among the reading elements 30 included in the image sensor 13e, the reading elements present in the maximum effective pixel width W1 will be defined as the first elements 31 and the reading elements present outside of the maximum effective pixel width W1 will be defined as the second elements 32. In the direction D2 of arrangement, the black background portion 13c2 encompasses the maximum effective pixel width W1. Accordingly, the first elements 31 are located in the range AR2 of the black background portion 13c2 in the direction D2 of arrangement. A range of the first elements 31 facing the black background portion 13c2 in the direction D2 of arrangement is smaller than the range AR2 of the black background portion 13c2. In the direction D2 of arrangement, the white background portion 13c1 is located outside the maximum effective pixel width W1 being equivalent to a standard size defined in ISO 216 plus margins. A range of the second elements 32 facing the background plate 13c in the direction D2 of arrangement is a range at least including part of the white background portion 13c1. FIG. 25 illustrates that the range of the second elements 32 in the direction D2 of arrangement is equivalent to a range that includes part of the black background portion 13c2 and part of the white background portion 13c1. In other words, the end portion 13c4 of the black background portion 13c2 on the white background portion side in the direction D2 of arrangement is located slightly outside the maximum effective pixel width W1. This arrangement is made in order that the first elements 31 being present in the maximum effective pixel width W1 may reliably face the black background portion 13c2 while taking into account attachment tolerance for the reading unit 13. As a matter of course, all of the second elements 32 that are present outside the maximum effective pixel width W1 in the direction D2 of arrangement may face the white background portion 13c1.

Figure 31:
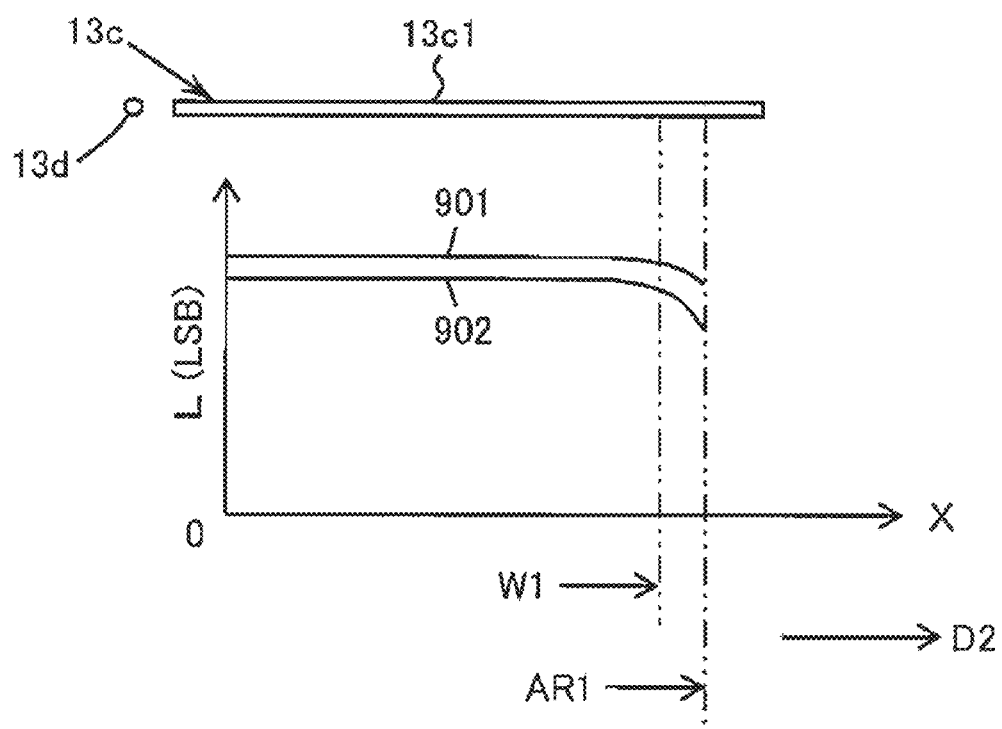
FIG. 31 is a diagram schematically illustrating an example of output characteristics relative to positions of the reading elements in the direction of arrangement.

As exemplified in FIG. 31, output characteristics of the reading elements 30 are not homogeneous. FIG. 31 schematically exemplifies output characteristics 901 and 902 of the reading elements 30 relative to a position X in the direction D2 of arrangement. The position X of each reading element 30 is also regarded as a position of the corresponding pixel. The vertical axis illustrated in FIG. 31 indicates read values L to be measured when the reading unit 13 is provided with the background plate 13c, in which all of the reading elements 30 included in the image sensor 13e face the white background portion 13c1. The read value L is expressed by luminance in LSB, for example. The output characteristic 901 represents an output characteristic when distances from the background plate 13c to the reading elements 30 are relatively short. Meanwhile, the output characteristic 902 represents an output characteristic when the distances from the background plate 13c to the reading elements 30 are relatively long.

Each of the output characteristics 901 and 902 has a tendency that, at a portion of the reading elements 30 located distant from the LEDs 13d, or in particular, at a portion of the reading elements 30 located in the reading range AR1 but outside the maximum effective pixel width W1, the read value L is gradually reduced as the relevant reading element 30 is more distant from the LEDs 13d. Uniformity is deteriorated when the distances from the background plate 13c to the reading elements 30 are increased. As a consequence, the tendency that the read value L is reduced as the distance from the LEDs 13d to the relevant reading element 30 is larger at the portion of the reading elements 30 located distant from the LEDs 13d.

Given the circumstances, this specific example is designed to obtain the correction data for shading correction by seeking the virtual background plate read data when the black background portion 13c2 is assumed to be the white background portion 13c1, by using the second elements 32 that are present outside the maximum effective pixel width W1. Here, when the sensor chips 13f for reading the white background portion 13c1 outside the maximum effective pixel width W1 are added to the image sensor 13e, the image sensor 13e is increased in size in the direction D2 of arrangement, which may lead to an increase in cost of the image sensor 13e. In this specific example, it is not necessary to add the sensor chip 13f to the image sensor 13e, and the image reading apparatus 10 is not increased in size in the direction D2 of arrangement.

Figure 26:
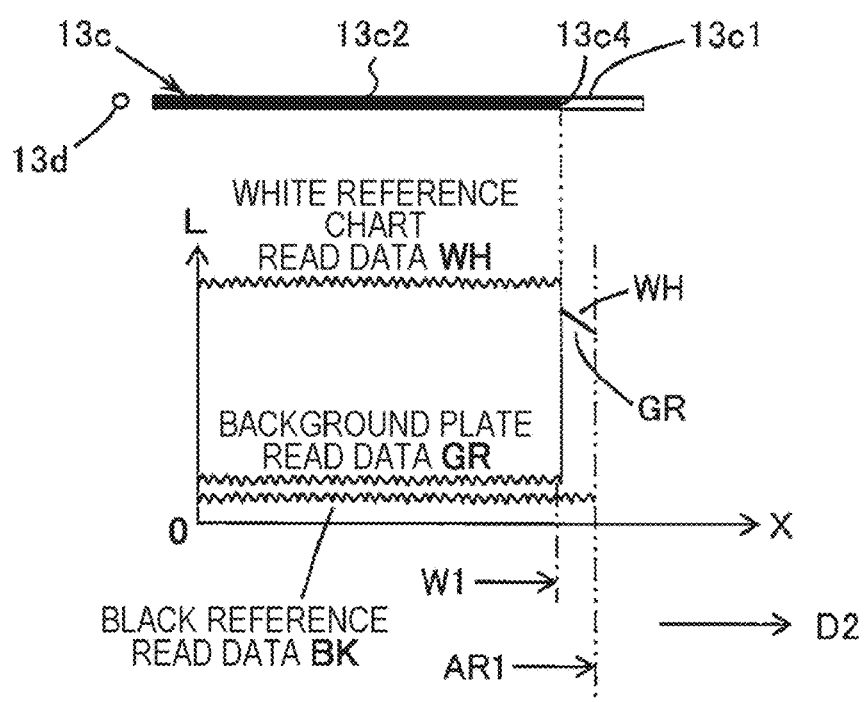
FIG. 26 is a diagram schematically illustrating an example of relations of read values to positions of the reading elements in the direction of arrangement.

FIG. 26 schematically exemplifies relations of the read values L to the positions X of the reading elements 30 in the direction D2 of arrangement.

The black reference read data BK is the read data of the background plate 13c not illuminated with the light LT1, that is, the read data of the background plate 13c when the background plate 13c is not illuminated with the light LT1 from the illumination unit 20. The background plate read data GR is the read data of the background plate 13c illuminated with the light LT1, that is, the read data when the background plate 13c is illuminated with the light LT1 from the illumination unit 20. In the background plate read data GR, the read values L with the first elements 31 facing the black background portion 13c2 are relatively small and the read values L with the second elements 32 facing the white background portion 13c1 are relatively large. The white reference read data WH is the read data of the white reference chart illuminated with the light LT1 in the state where the white reference chart such as a white reference plate is located in the maximum effective pixel width W1. The white reference chart is also regarded as the original copy G having a substantially pure white image. The white reference read data WH may include the read values L with all of the reading elements 30 that are present in the reading range AR1. However, the read values L only need to be obtained from the first elements 31 that are present in the maximum effective pixel width W1. Note that the read data means a group of the read values L with the respective reading elements 30 corresponding to the positions X.

Since the first elements 31 present in the maximum effective pixel width W1 face the black background portion 13c2, the background plate read data GR cannot be directly used for shading correction. Accordingly, as illustrated in FIGS. 27 and 28, the background plate read data GR is converted into the virtual background plate read data GR', which corresponds to the read data of the background plate 13c illuminated with the light LT1 when the black background portion 13c2 is assumed to be the white background portion 13c1.

Figure 27:
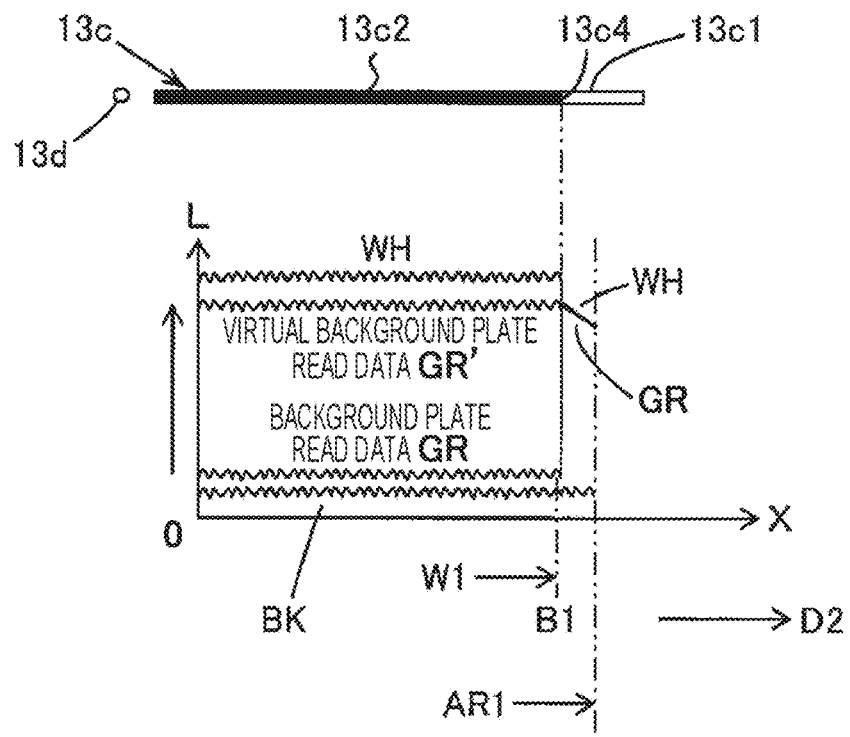
FIG. 27 is a diagram schematically illustrating an example of converting background plate read data into virtual background plate read data corresponding to read data of a white background portion.

FIG. 27 schematically exemplifies an aspect of converting the background plate read data GR into the virtual background plate read data GR' corresponding to the read data of the white background portion 13c1. FIG. 28 schematically exemplifies an aspect of converting the background plate read data GR into the virtual background plate read data GR' based on the difference between the black background read value Lb and the virtual white background read value L0.

As illustrated in FIG. 31, the output characteristics 901 and 902 of the reading elements 30 have the tendency that, at the portion of the reading elements 30 located in the reading range AR1 but outside the maximum effective pixel width W1, the read value L is gradually reduced as the relevant reading element 30 is more distant from the LEDs 13d. Accordingly, the virtual white background read value L0 assumed to be the read value at the specific position located at the boundary portion B1 of the maximum effective pixel width W1 in the direction D2 of arrangement is first obtained based on the white background read values Lw1 and Lw2 at the reading positions in the white background portion 13c1 in the direction D2 of arrangement. In the example illustrated in FIG. 28, the pixel n0 is located at the specific position and the pixels n1 and n2 are located at the reading positions. Note that the specific position located at the boundary portion B1 of the maximum effective pixel width W1 is not limited to the position of the outermost first element among the first elements 31. The specific position may be a position of the first element among the first elements 31, which is located inward from the outermost first element, in a range that is one of the two ends in the direction D2 of arrangement of the black background portion 13c2 being closer to end portion 13c4 on the white background portion side than the end portion 13c3 on the light source side is. The reading positions are not limited only to the two positions but may be equal to or more than three positions.

This specific example is designed to obtain the virtual white background read value L0 at the specific position (the pixel n0) by performing the approximate calculation based on the relations of the white background read values Lw1 and Lw2 with the reading positions (the pixels n1 and n2). The approximation of the relations of the white background read values Lw1 and Lw2 with the reading positions (the pixels n1 and n2) may adopt polynomial approximation of second degree or higher, or may adopt linear approximation. FIG. 28 illustrates the example of obtaining the virtual white background read value L0 by using the linear approximation. Here, in the direction D2 of arrangement, the position of the pixel n0 is indicated with n0, the position of the pixel n1 is indicated with n1, the position of the pixel n2 is indicated with n2, and a relation 0<n0<n1<n2 is assumed to hold true. The virtual white background read value L0 can be calculated by the following formula:

$$L0 = Lw2 + (Lw1 - Lw2)/(n2 - n1) \times (n2 - n0) \quad (14).$$

Here, the read value L of the pixel n0 at the specific position located at the boundary portion B1 is defined as the black background read value Lb. The difference L0−Lb between the black background read value Lb and the virtual white background read value L0 at the pixel n0 corresponds to a difference between the read data of the black background portion 13c2 and the read data of the white background portion 13c1 in the state where the background plate 13c is illuminated with the light LT1. Accordingly, the virtual background plate read data GR' is obtained by adding the aforementioned difference L0−Lb as an offset to a portion of the background plate read data GR corresponding to the maximum effective pixel width W1:

$$GR' = GR + (L0 - Lb) \quad (15).$$

As described above, it is possible to obtain the virtual white background read value L0 at the specific position by performing the approximate calculation based on the relations of the white background read values Lw1 and Lw2 with the reading positions in the direction D2 of arrangement.

3. SPECIFIC EXAMPLE OF PROCESSING BY IMAGE READING APPARATUS

Figure 29:
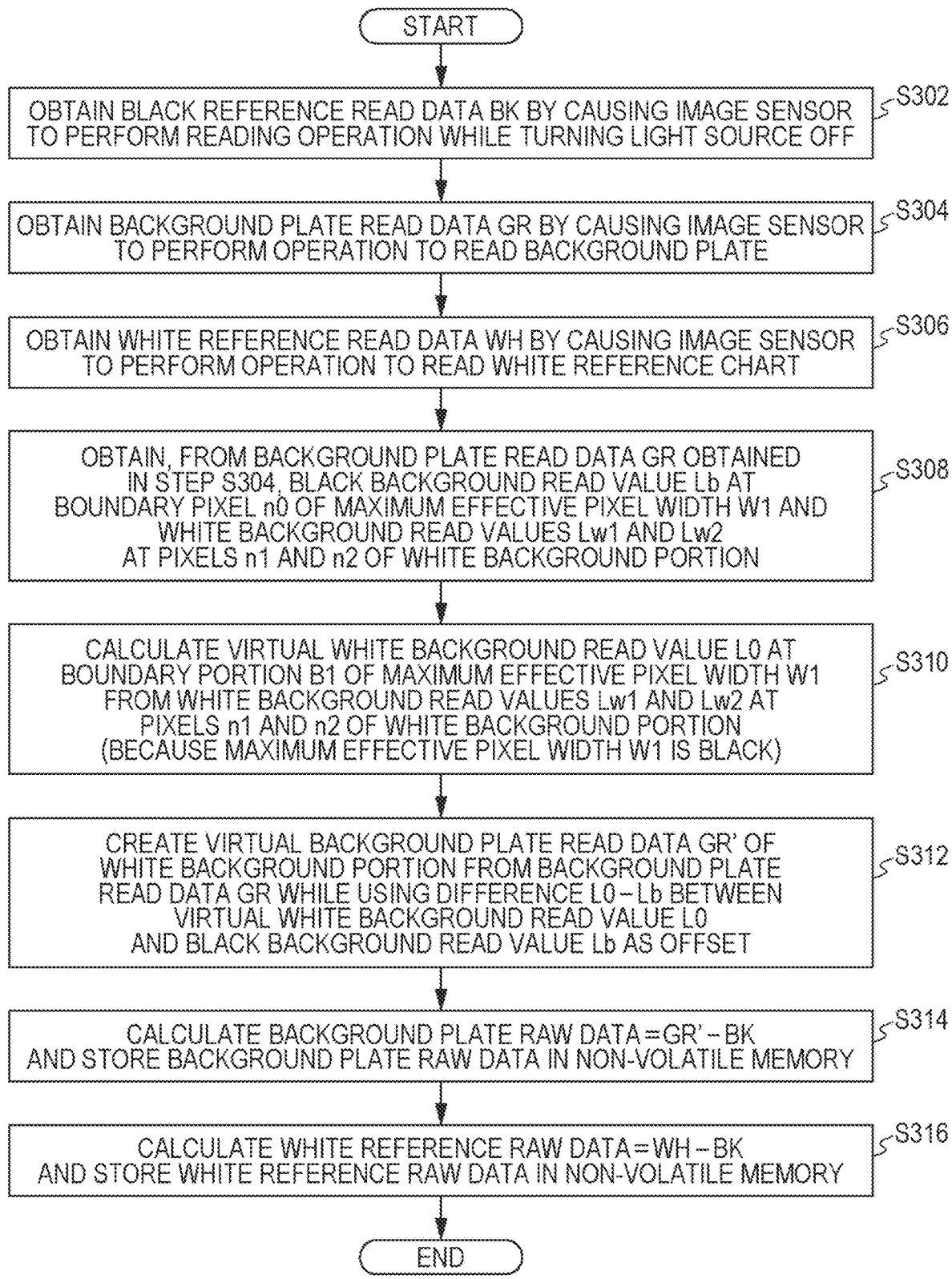
FIG. 29 is a flowchart schematically illustrating an example of preliminary processing to calculate background plate reference difference data and white reference difference data and to store these data in a storage unit.

FIG. 29 schematically exemplifies preliminary processing to calculate the background plate RAW data GR'−BK and the white reference RAW data WH−BK and to store these data in the non-volatile memory 17. This preliminary processing is carried out by the control unit 15 before shipping the image reading apparatus 10. The control unit 15 starts the preliminary processing when a prescribed operation to start the preliminary processing is accepted, for example, through the touch panel 16. In the following description, codes of steps may be indicated in parentheses as appropriate.

When the preliminary processing is started, the control unit 15 causes the image sensor 13e to read the background plate 13c in the state of turning the LEDs 13d off, thereby obtaining the black reference read data BK being the read data of the background plate 13c not illuminated with the light LT1 from the image sensor 13e (step S302).

Subsequently, the control unit 15 turns the LEDs 13d on and then causes the image sensor 13e to read the background plate 13c, thereby obtaining the background plate read data GR being the read data of the background plate 13c illuminated with the light LT1 from the image sensor 13e (step S304).

Thereafter, an operator performs an operation to locate the white reference chart to a range where the image sensor 13e reads the image on the original copy. In this state, the control unit 15 causes the image sensor 13e to read the white reference chart in the state of turning the LEDs 13d on, thereby obtaining the white reference read data WH being the read data of the white reference chart illuminated with the light LT1 from the image sensor 13e (step S306).

Next, from the background plate data GR obtained in step S304, the control unit 15 obtains the black background read value Lb of the pixel n0 located at the boundary portion B1 of the maximum effective pixel width W1 and the white background read values Lw1 and Lw2 of the pixels n1 and n2 corresponding to the reading positions in the white background portion 13c1 (step S308). The black background read value Lb is the read value L at the specific position which is located, in the black background portion 13c2, closer to the end portion 13c4 on the white background portion side than to the end portion 13c3 on the light source side. The white background read values Lw1 and Lw2 are the read values L at the reading positions in the white background portion 13c1 in the direction D2 of arrangement.

Then, the control unit 15 calculates, based on the white background read values Lw1 and Lw2, the virtual white background read value L0, which is assumed to be the read value L at the specific position on the hypothesis that the specific position located at the boundary portion B1 of the maximum effective pixel width W1 is in the white background portion 13c1 in the background plate 13c (step S310). The processing in step S310 is carried out because the portion corresponding to the maximum effective pixel width W1 in the background plate 13c is the black background portion 13c2. As illustrated in FIG. 28, the control unit 15 obtains the virtual white background read value L0 at the specific position by performing the approximate calculation based on the relations of the white background read values Lw1 and Lw2 with the reading positions in the direction D2 of arrangement. For example, the control unit 15 can calculate the virtual white background read value L0 in accordance with the above-mentioned formula (14).

Next, the control unit 15 creates the virtual background plate read data GR', which corresponds to the read data of the white background portion 13c1, by adding the difference L0–Lb between the virtual white background read value L0 and the black background read value Lb as the offset to the background plate read data GR in the maximum effective pixel width W1 (step S312). In this way, the control unit 15 converts the background plate read data GR into the virtual background plate read data GR' based on the difference L0–Lb between the black background read value Lb and the virtual white background read value L0.

Subsequently, the control unit 15 calculates the background plate RAW data GR'–BK that represents the difference between the virtual background plate read data GR' and the black reference read data BK, and stores the background plate RAW data GR'–BK in the non-volatile memory 17 (step S314). As described above, the virtual background plate read data GR' corresponds to the read data of the background plate 13c illuminated with the light LT1 when the black background portion 13c2 is assumed to be the white background portion 13c1, and the black reference read data BK is the read data of the background plate 13c not illuminated with the light LT1. Here, as the background plate RAW data, the control unit 15 may store the virtual background plate read data GR' and the black reference read data BK separately in the non-volatile memory 17. The background plate RAW data GR'–BK only needs to have the data corresponding to the maximum effective pixel width W1.

Lastly, the control unit 15 calculates the white reference RAW data WH–BK that represents the difference between the white reference read data WH and the black reference read data BK, and stores the white reference RAW data WH–BK in the non-volatile memory 17 (step S316). As described above, the white reference read data WH corresponds to the read data of the white reference chart. Here, as the white reference RAW data, the control unit 15 may store the white reference read data WH and the black reference read data BK separately in the non-volatile memory 17. The white reference RAW data WH–BK only needs to have the data corresponding to the maximum effective pixel width W1.

Assuming that the image on the original copy G is read without performing the shading correction, the control unit 15 of this specific example converts, as described with reference to FIG. 6, the output read value L into the output value in such a way as to set the output value equal to the minimum value of 0 when the read value L is equal to the value of the black reference read data BK, or to set the output value equal to the maximum value of 255 when the read value L is equal to the value of the white reference read data WH. When the output value is defined as the value Dout, the value Dout can be calculated by the following formula:

$$\text{Dout}=(L-BK)/(WH-BK)\times 255 \qquad (16).$$

As a matter of fact, the control unit 15 is configured to obtain the white shading data SD at least at one of the point before reading the original copy G and the point when the image reading apparatus 10 is powered on in order to compensate for unevenness in density among the pixels attributed to uneven illumination or the like. The white shading data SD represents an example of the correction data for shading correction.

FIG. 30 schematically exemplifies the white shading correction processing. The control unit 15 starts the white shading correction processing before reading the original copy G and when the image reading apparatus 10 is powered on. Note that the control unit 15 may perform the white shading correction processing before reading the original copy G while skipping the white shading correction processing when the image reading apparatus 10 is powered on. Alternatively, the control unit 15 may perform the white shading correction processing when the image reading apparatus 10 is powered on while skipping the white shading correction processing before reading the original copy G. Here, step S402 corresponds to the first step, step S404 corresponds to the second step, step S406 corresponds to the third step, step S408 corresponds to the fourth step, step S410 corresponds to the fifth step, and steps S412 and S414 collectively correspond to the sixth step.

When the white shading correction processing is started, the control unit 15 causes the image sensor 13e to read the background plate 13c in the state of turning the LEDs 13d off, thereby obtaining the black reference read data BK_S, which is the read data of the background plate 13c not illuminated with the light LT1, from the image sensor 13e (step S402).

Next, the control unit 15 causes the image sensor 13e to read the background plate 13c after turning the LEDs 13d on, thereby obtaining the background plate read data GR_S, which is the read data of the background plate 13c illuminated with the light LT1, from the image sensor 13e (step S404).

Then, the control unit 15 obtains, from the background plate read data GR_S obtained in step S404, the black background read value Lb at the pixel n0 located at the boundary portion B1 of the maximum effective pixel width W1, and the white background read values Lw1 and Lw2 at the pixels n1 and n2 in the white background portion 13c1 (step S406). As described above, the black background read value Lb is the read value L at the specific position which is located closer to the end portion 13c4 on the white background portion side than to the end portion 13c3 on the light source side in the black background portion 13c2. The white background read values Lw1 and Lw2 are the read values L at the reading positions in the white background portion 13c1 in the direction D2 of arrangement.

Subsequently, the control unit 15 calculates, based on the white background read values Lw1 and Lw2, the virtual white background read value L0, which is assumed to be the read value L at the specific position on the hypothesis that the specific position located at the boundary portion B1 of the maximum effective pixel width W1 is in the white background portion 13c1 in the background plate 13c (step S408). As illustrated in FIG. 28, the control unit 15 obtains the virtual white background read value L0 at the specific position by performing the approximate calculation based on the relations of the white background read values Lw1 and Lw2 with the reading positions in the direction D2 of arrangement. For example, the control unit 15 can calculate the virtual white background read value L0 in accordance with the above-described formula (14).

Next, the control unit 15 creates the virtual background plate read data GR_S', which corresponds to the read data of the white background portion 13c1, by adding, to the background plate read data GR_S in the maximum effective pixel width W1, the difference L0–Lb between the virtual white background read value L0 and the black background read value Lb as the offset (step S410). In this way, the control unit 15 converts the background plate read data GR_S into the virtual background plate read data GR_S' based on the difference L0−Lb between the black background read value Lb and the virtual white background read value L0.

Then, the control unit 15 calculates immediately preceding background plate RAW data GR_S'−BK_S representing a difference between the virtual background plate read data GR_S' and the black reference read data BK_S (step S412). As described above, the virtual background plate read data GR_S' corresponds to the read data of the background plate 13c illuminated with the light LT1 on the assumption that the black background portion 13c2 is the white background portion 13c1, and the black reference read data BK_S is the read data of the background plate 13c not illuminated with the light LT1. The immediately preceding background plate RAW data GR_S'−BK_S only needs to have the data corresponding to the maximum effective pixel width W1.

Lastly, the control unit 15 obtains the white shading data SD based on the immediately preceding background plate RAW data GR_S'−BK_S, and the background plate RAW data GR'−BK and the white reference RAW data WH−BK stored in the non-volatile memory 17 (step S414). The white shading data SD only needs to have the data corresponding to the maximum effective pixel width W1. For example, the white shading data SD can be calculated in accordance with the following formula:

$$SD=\{(WH-BK)/(GR'-BK)\}\times(GR\_S'-BK\_S) \quad (17).$$

The formula (17) is also regarded as multiplication of a ratio $\{(GR\_S'-BK\_S)/(GR'-BK)\}$ of the immediately preceding background plate RAW data GR_S'−BK_S relative to the background plate RAW data GR'−BK by the white reference difference data (WH−BK). Accordingly, the white shading data SD is also regarded as the read data of the white reference chart to be assumed on the hypothesis that the white reference chart, which may not be in hand of the user, is disposed in the range for reading the image on the original copy G. For example, the control unit 15 converts the read value L into the output value in such a way as to set the output value equal to the minimum value of 0 when the read value L is equal to the value of the black reference read data BK_S, or to set the output value equal to the maximum value of 255 when the read value L is equal to the value of the white shading data SD. When the output value after being subjected to the shading correction is defined as a value Dout', the value Dout' can be calculated by the following formula:

$$\text{Dout}'=(L-BK\_S)/SD\times 255 \quad (18).$$

Thus, the control unit 15 can perform shading correction by using the white shading data SD.

As described above, the virtual background plate read data GR_S' when the black background portion 13c2 is assumed to be the white background portion 13c1 is obtained from the background plate read data GR_S being the read data of the background plate 13c including the black background portion 13c2 and the white background portion 13c1, and the white shading data SD for shading correction is obtained. The control unit 15 can cut out the image on the original copy G by performing the shading correction using the white shading data SD. Accordingly, this specific example can make it unnecessary to provide the switching mechanism between the white background for shading correction and the black background for cutting out the original copy. As a consequence, this configuration leads to reduction in the number of components of the image reading apparatus, thus enabling shading correction and image cutting by using the low-cost configuration.

4. MODIFIED EXAMPLES

Various modified examples can be considered in the present disclosure.

For example, the image reading apparatus is not limited only to a double-sided image reading apparatus configured to read images on two sides of an original copy G but may be a single-sided image reading apparatus configured to read images only on one side of an original copy G.

The above-described processing can be modified as appropriate, for example, by changing the order. For example, in the preliminary processing illustrated in FIG. 29, the processing in S302 can be carried out after any of the processing in S304, S306, S308, S310, and S312 as long as the relevant processing takes place before the processing in S314. In the white shading correction processing illustrated in FIG. 30, the processing in S402 can be carried out after any of the processing in S404, S406, S408, and S410 as long as the relevant processing takes place before the processing in S412.

The layout of the white background portions 13c1 and the black background portions 13c2 in the background plate 13c are not limited only to the layouts illustrated in FIGS. 25 to 28. For example, in addition to the white background portion 13c1 located at the position more distant from the LEDs 13d in the direction D2 of arrangement than the black background portion 13c2 is, the background plate 13c may include another white background portion 13c1 located at a position closer to the LEDs 13d in the direction D2 of arrangement than the black background portion 13c2 is. Further, the present technique is also applicable to the background plates 13c illustrated in FIGS. 4, 17, 20, and 22, since each of these background plates 13c includes the white background portion 13c1 located at the position more distant from the LEDs 13d in the direction D2 of arrangement than the black background portion 13c2 is.

Figure 32:
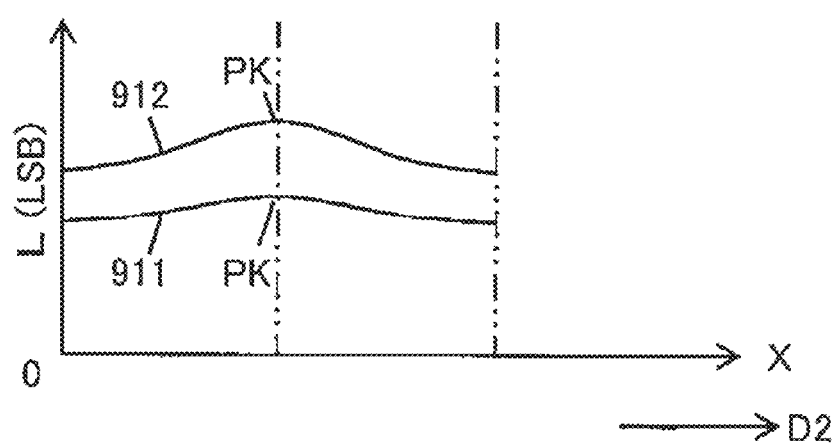
FIG. 32 is a diagram schematically illustrating an example of output characteristics of a sensor chip.

The present technique is also applicable to a case where output values from reading elements 30 in a single sensor chip 13f are uneven as exemplified in FIG. 32. FIG. 32 schematically illustrates an example of the output characteristics of the sensor chip 13f. The position X of each reading element 30 is also regarded as the position of the corresponding pixel. The vertical axis illustrated in FIG. 32 indicates the read values L to be measured when the reading unit 13 is provided with the background plate 13c, in which all of the reading elements 30 included in the sensor chip 13f face the white background portion 13c1. An output characteristic 911 represents an output characteristic when an environmental temperature of the sensor chip 13f is relatively low. Meanwhile, an output characteristic 912 represents an output characteristic when the environmental temperature of the sensor chip 13f is relatively high.

Each of the output characteristics 911 and 912 has a peak PK of the highest read value L at a central portion in the direction D2 of arrangement. The read value L tends to be gradually reduced as a point of measurement recedes from the peak PK. The uniformity is deteriorated more as the environmental temperature of the sensor chip 13f is higher, and the read value L tends to be reduced more as the point of measurement recedes from the peak PK.

Given the circumstances, the control unit 15 can perform the processing illustrated in FIGS. 29 and 30 when the reading element 30 at the position of the peak PK faces the black background portion 13c2 and there are the second elements 32 among the reading elements 30 included in the sensor chip 13f, which face the white background portion 13c1. As a consequence, the control unit 15 can cut out an image on the original copy G by performing shading correction by using the white shading data SD.

5. CONCLUSION

As described above, according to the present disclosure, it is possible to provide, for example, the technique in various aspects, which do not require the mechanism for switching between the white background for shading correction and the black background for cutting out the original copy. Needless to say, the above-described basic operation and effects can be obtained from the technique consisting of the constituents defined in the independent claims.

Further, it is also possible to embody a configuration obtained by replacing or changing a combination of the constituents disclosed in any of the above-described examples, a configuration obtained by replacing or changing a combination of the constituents according to the publicly known techniques and those disclosed in any of the above-described examples, and the like. The present disclosure also encompasses these configurations and the like.

What is claimed is:

1. An image reading apparatus comprising:
   a reading module including reading elements arranged in a direction of arrangement intersecting a direction of transportation of an original copy, and configured to read an image on the original copy transported on a transportation route;
   an illumination unit that illuminates, with light, a reading range to be read by the reading module; and
   a background plate facing the reading elements at a position illuminated with the light, wherein
   the reading module, the illumination unit, and the background plate are disposed at positions fixed in the direction of transportation,
   the background plate includes
      at least one white background portion for shading correction, and
      at least one black background portion for cutting out the original copy, the black background portion having lower brightness than brightness of the white background portion,
   the illumination unit includes
      a light source located on one of outer sides of the reading elements in the direction of arrangement, and
      a light guide that guides the light from the light source to the reading range,
   an area of the black background portion is larger than an area of the white background portion, and
   the white background portion and the black background portion are arranged in the direction of arrangement.

2. The image reading apparatus according to claim 1, further comprising:
   a separation unit disposed upstream of the reading module in the direction of transportation at substantially a central region of the transportation route in the direction of arrangement and configured to separate one sheet of the original copy from sheets of the original copy, wherein
   the black background portion is located at a position including the separation unit in the direction of arrangement, and
   the white background portion is located at a position not including the separation unit.

3. The image reading apparatus according to claim 1, wherein
   the white background portion and the black background portion of the background plate are disposed in one plane where distances from the reading module are equal.

4. The image reading apparatus according to claim 1, wherein
   the white background portions are provided in zones at two ends of the background plate in the direction of arrangement, and
   the black background portion is provided in a zone between the white background portions.

5. The image reading apparatus according to claim 1, wherein
   the reading elements are arranged in the direction of arrangement in the reading module, and
   part of the white background portion is located at a position facing an effective reading element near an end portion of the reading elements.

6. The image reading apparatus according to claim 1, wherein
   a gradation background portion in which brightness is gradually changed is provided between the white background portion and the black background portion.

7. The image reading apparatus according to claim 1, wherein
   the white background portions and the black background portions are alternately arranged.

8. The image reading apparatus according to claim 1, further comprising:
   a control unit that controls reading of the image, wherein
   the control unit reads the white background portion and the black background portion with the reading module in a state where the original copy is not present, and creates, based on read data of the white background portion and the black background portion read by the control unit, correction data, the correction data being used for correcting read data of the original copy, and
   after reading the image on the original copy, the control unit cuts out, based on the read data of the original copy in the black background portion and based on the correction data, data of the image on the original copy.

9. The image reading apparatus according to claim 8, wherein,
   when three vertices out of four vertices of the original copy are present in the black background portion, the control unit does not use the read data of the original copy concerning a portion that runs off the black background portion.

10. The image reading apparatus according to claim 1, further comprising:
    a control unit that controls reading of the image, wherein,
    when two or less vertices out of four vertices of the original copy are present in the black background portion, the control unit specifies, based on an intersecting point of an extension line of an edge portion at a front end of the original copy passing through the black background portion with an end portion of the reading range of the reading module, a vertex at a rear end of the original copy, and
    the control unit does not use a portion of the read data regarding a region outside of the reading range while using the vertices as reference.

11. The image reading apparatus according to claim 10, further comprising:
a storage unit that stores data; and
a control unit that controls reading of the image, wherein
the white background portion is located at a position more distant from the light source in the direction of arrangement than the black background portion is,
the storage unit stores
background plate reference difference data representing a difference between read data of the background plate illuminated with the light on an assumption that the black background portion is the white background portion and read data of the background plate not illuminated with the light, and
white reference difference data representing a difference between read data of a white reference chart illuminated with the light in a state where the white reference chart is disposed in a range for reading the image and the read data of the background plate not illuminated with the light,
the control unit
obtains black reference read data from the reading module, the black reference read data representing the read data of the background plate not illuminated with the light,
obtains background plate read data from the reading module, the background plate read data representing the read data of the background plate illuminated with the light,
obtains, from the background plate read data, a black background read value at a specific position located closer to an end portion on a white background portion side than to an end portion on a light source side out of two ends in the direction of arrangement of the black background portion, and white background read values at reading positions in the white background portion in the direction of arrangement,
obtains, based on the white background read values, a virtual white background read value assumed to be a read value at the specific position on a hypothesis that the specific position is in the white background portion,
based on a difference between the black background read value and the virtual white background read value, converts the background plate read data into virtual background plate read data corresponding to read data of the white background portion, and
obtains, based on a difference between the virtual background plate read data and the black reference read data, based on the background plate reference difference data, and based on the white reference difference data, correction data used for the shading correction.

12. The image reading apparatus according to claim 11, wherein
the control unit obtains the virtual white background read value at the specific position by performing approximate calculation based on relations of the white background read values with the reading positions in the direction of arrangement.

13. The image reading apparatus according to claim 11, wherein
the control unit carries out processing to obtain the correction data at least at one of a point before reading the original copy and a point when the image reading apparatus is powered on.

14. The image reading apparatus according to claim 11, wherein
the reading elements include
first elements being present in a maximum range for reading the image in the direction of arrangement,
second elements being present outside of the maximum range in the direction of arrangement, and
the first elements are located in a range of the black background portion in the direction of arrangement.

15. The image reading apparatus according to claim 14, wherein
the specific position is a position at a boundary portion of the maximum range in the direction of arrangement.

16. The image reading apparatus according to claim 14, wherein
in the direction of arrangement, a range of the reading elements facing the background plate is smaller than a total range of the black background portion and the white background portion, and
in the direction of arrangement, a range of the first elements facing the black background portion is smaller than the range of the black background portion, and
in the direction of arrangement, a range of the second elements facing the background plate is a range at least including part of the white background portion.

17. A method of creating correction data for an image reading apparatus including
a reading module including reading elements arranged in a direction of arrangement intersecting a direction of transportation of an original copy, and configured to read an image on the original copy transported on a transportation route,
an illumination unit that illuminates, with light, a reading range to be read by the reading module, and
a background plate facing the reading elements at a position illuminated with the light, in which
the reading module, the illumination unit, and the background plate are disposed at positions fixed in the direction of transportation,
the background plate includes
a white background portion for shading correction, and
a black background portion for cutting out the original copy, the black background portion having lower brightness than brightness of the white background portion,
an area of the black background portion is larger than an area of the white background portion, and
the white background portion and the black background portion are arranged in the direction of arrangement,
the method comprising:
reading the white background portion and the black background portion with the reading module in a state where the original copy is not present, and creating, based on read data of the white background portion and the black background portion being read, correction data used for correcting read data of the original copy; and
after reading the image on the original copy, cutting out, based on the read data of the original copy in the black background portion and based on the correction data, data of the image on the original copy.

18. A method of creating correction data for an image reading apparatus including
a reading module including reading elements arranged in a direction of arrangement intersecting a direction of transportation of an original copy, and configured to read an image on the original copy being transported, an illumination unit that illuminates, with light, a reading range to be read by the reading module, a background plate facing the reading elements at a position illuminated with the light, and a storage unit that stores data, in which the reading module, the illumination unit, and the background plate are disposed at positions fixed in the direction of transportation, the background plate includes
- a white background portion for shading correction, and
- a black background portion for cutting out the original copy, the black background portion having lower brightness than brightness of the white background portion, the illumination unit includes
- a light source located on one of outer sides of the reading elements in the direction of arrangement, and
- a light guide that guides the light from the light source to the reading range, the white background portion is located at a position more distant from the light source in the direction of arrangement than the black background portion is, the storage unit stores
- background plate reference difference data representing a difference between read data of the background plate illuminated with the light on an assumption that the black background portion is the white background portion and read data of the background plate not illuminated with the light, and
- white reference difference data representing a difference between read data of a white reference chart illuminated with the light in a state where the white reference chart is disposed in a range for reading the image and the read data of the background plate not illuminated with the light, the method comprising:

a first step of obtaining black reference read data from the reading module, the black reference read data representing the read data of the background plate not illuminated with the light;

a second step of obtaining background plate read data from the reading module, the background plate read data representing the read data of the background plate illuminated with the light;

a third step of obtaining, from the background plate read data, a black background read value at a specific position located closer to an end portion on a white background portion side than to an end portion on a light source side out of two ends in the direction of arrangement of the black background portion, and white background read values at reading positions in the white background portion in the direction of arrangement;

a fourth step of obtaining, based on the white background read values, a virtual white background read value assumed to be a read value at the specific position on a hypothesis that the specific position is in the white background portion;

a fifth step of converting, based on a difference between the black background read value and the virtual white background read value, the background plate read data into virtual background plate read data corresponding to read data of the white background portion; and a sixth step of obtaining, based on a difference between the virtual background plate read data and the black reference read data, based on the background plate reference difference data, and based on the white reference difference data, correction data used for the shading correction.

* * * * *